(12) United States Patent
Sasaki

(10) Patent No.: US 6,680,815 B2
(45) Date of Patent: Jan. 20, 2004

(54) THIN FILM MAGNETIC HEAD AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 287 days.

(21) Appl. No.: 09/726,444

(22) Filed: Dec. 1, 2000

(65) Prior Publication Data

US 2001/0000303 A1 Apr. 19, 2001

(30) Foreign Application Priority Data

Dec. 7, 1999 (JP) .......................................... 11-347628

(51) Int. Cl.[7] .............................................. G11B 5/147
(52) U.S. Cl. ...................................... 360/126; 360/313
(58) Field of Search ................................. 360/126, 313

(56) References Cited

U.S. PATENT DOCUMENTS

| | | | |
|---|---|---|---|
| 5,438,747 A | 8/1995 | Krounbi et al. | |
| 5,600,519 A | 2/1997 | Heim et al. | |
| 6,169,642 B1 | * 1/2001 | Mino et al. | 360/126 |
| 6,330,127 B1 | * 12/2001 | Sasaki | 360/126 |
| 6,377,423 B2 | * 4/2002 | Dill et al. | 360/126 |

FOREIGN PATENT DOCUMENTS

| | | |
|---|---|---|
| JP | 7-262519 | 10/1995 |
| JP | 8-249614 | 9/1996 |

* cited by examiner

*Primary Examiner*—George J. Letscher
*Assistant Examiner*—Mark Blouin
(74) *Attorney, Agent, or Firm*—Oliff & Berridge, PLC

(57) ABSTRACT

Provided are a thin film magnetic head and a method of manufacturing the same which can obtain sufficient overwrite properties even when a pole width is reduced. Aside from an insulating film for embedding thin film coils, an insulating film pattern made of a photoresist or the like is formed between a top pole chip and the thin film coils. A TH0 position is defined by a front edge of the insulating film pattern. The insulating film pattern has a round inclined surface near the front edge thereof, and consequently a magnetic flux smoothly flows through a top connection portion on the insulating film pattern. A region between the insulating film pattern and a front portion of a top pole is filled with the top connection portion, and thus a sufficient magnetic volume is ensured in this region. The top pole chip is partly covered with the top connection portion on at least three sides. Thus, an area of contact between the top pole chip and the top connection portion is increased, and therefore a loss of magnetic flux propagation on a boundary surface between both of them is reduced.

14 Claims, 34 Drawing Sheets

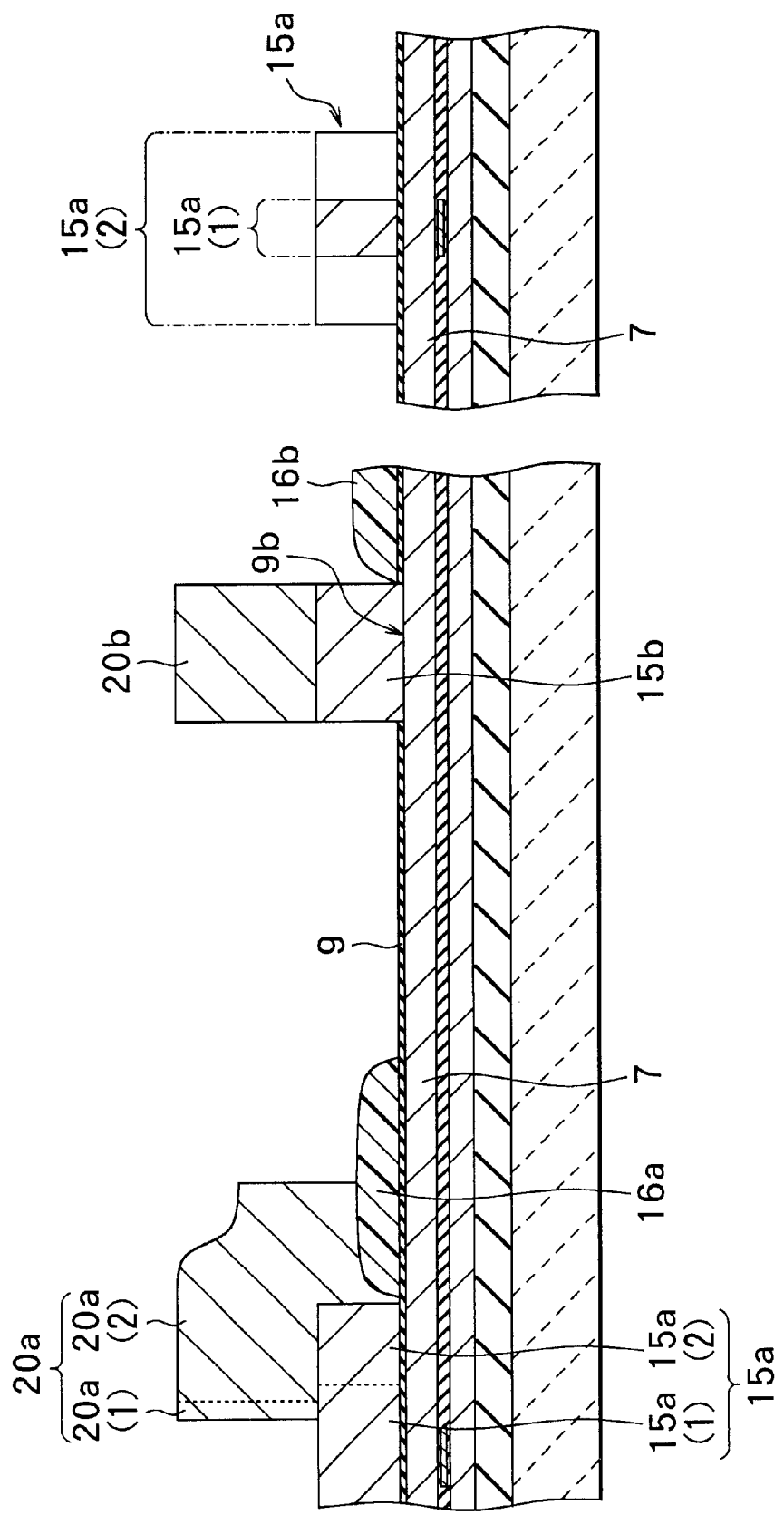

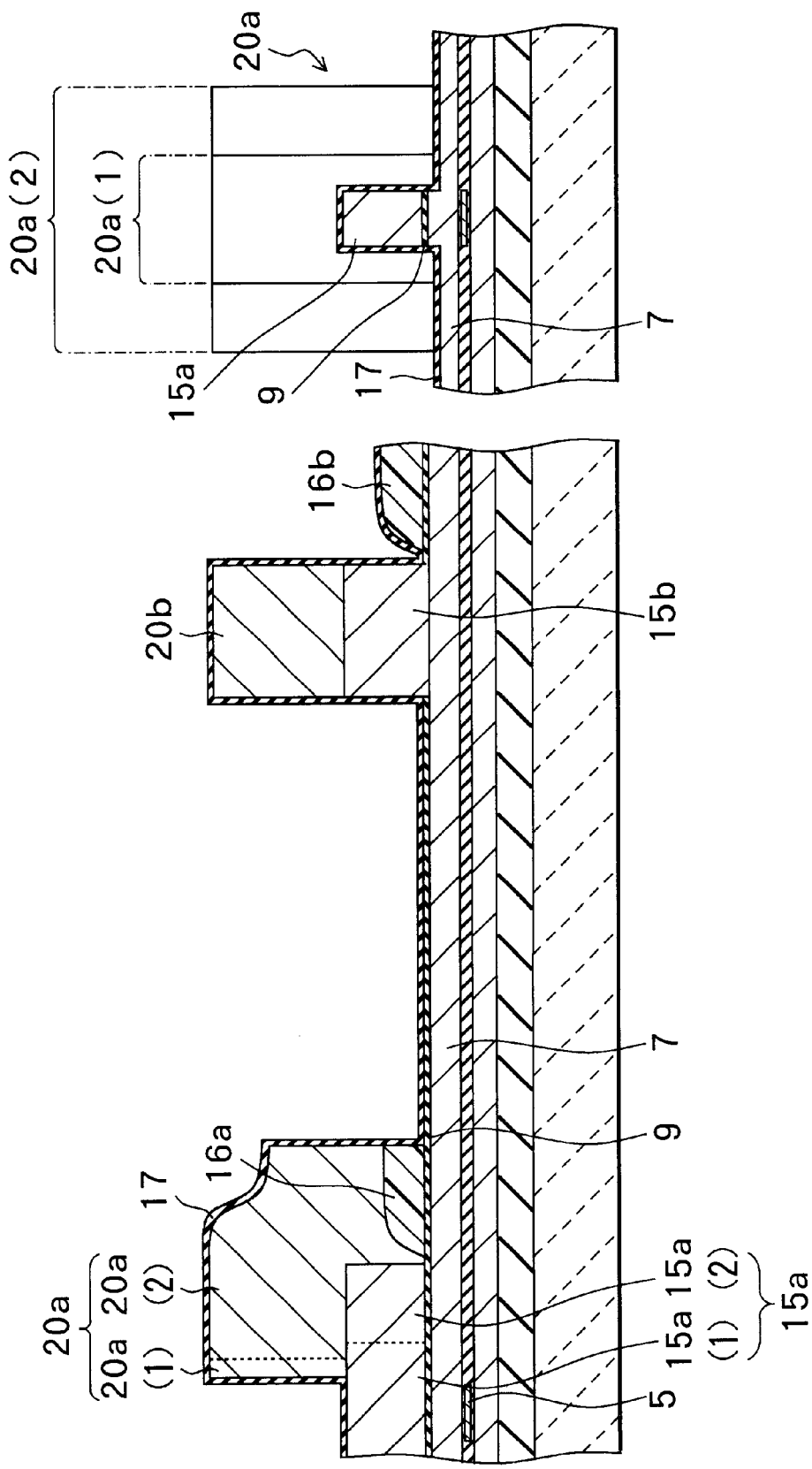

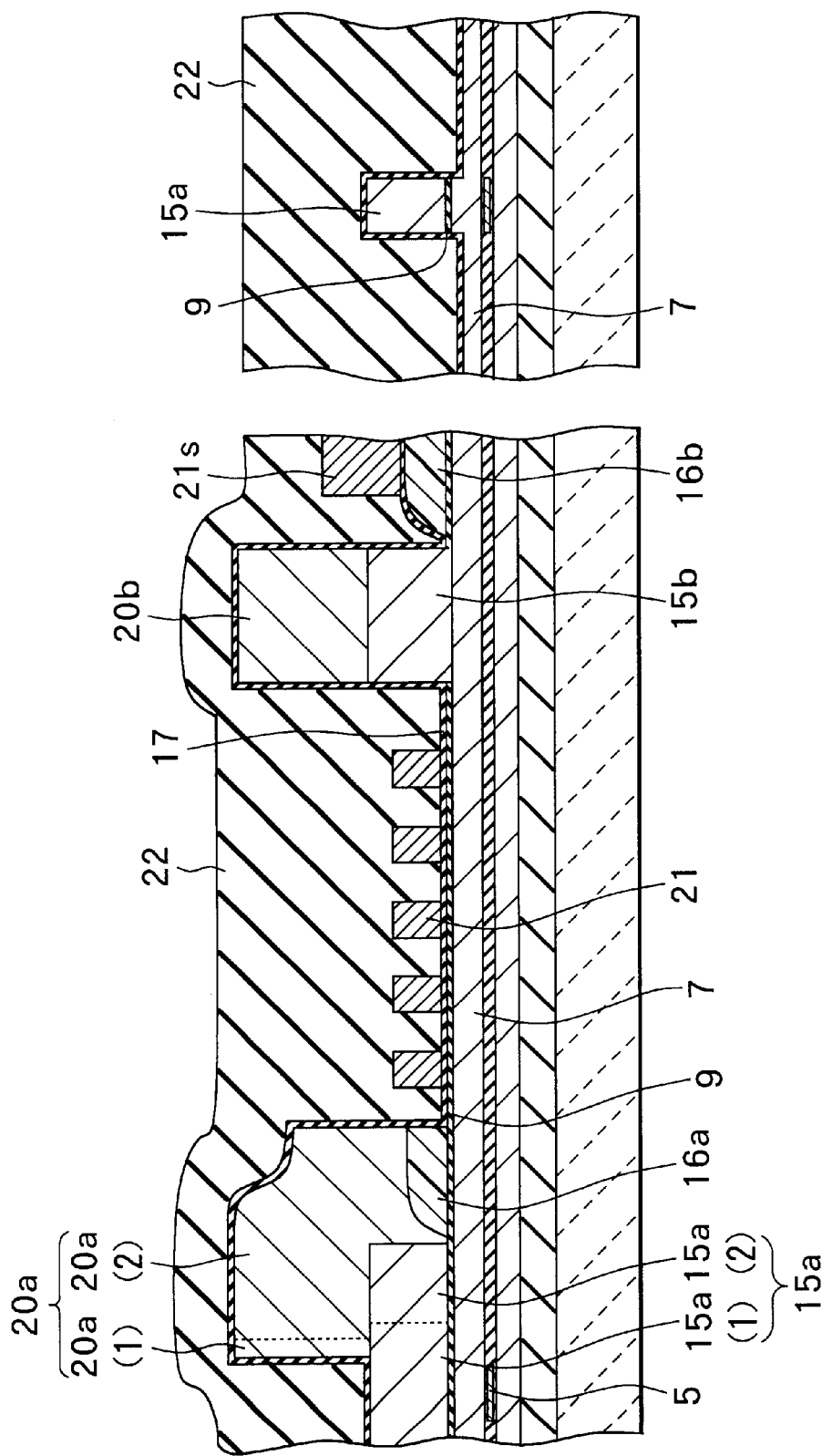

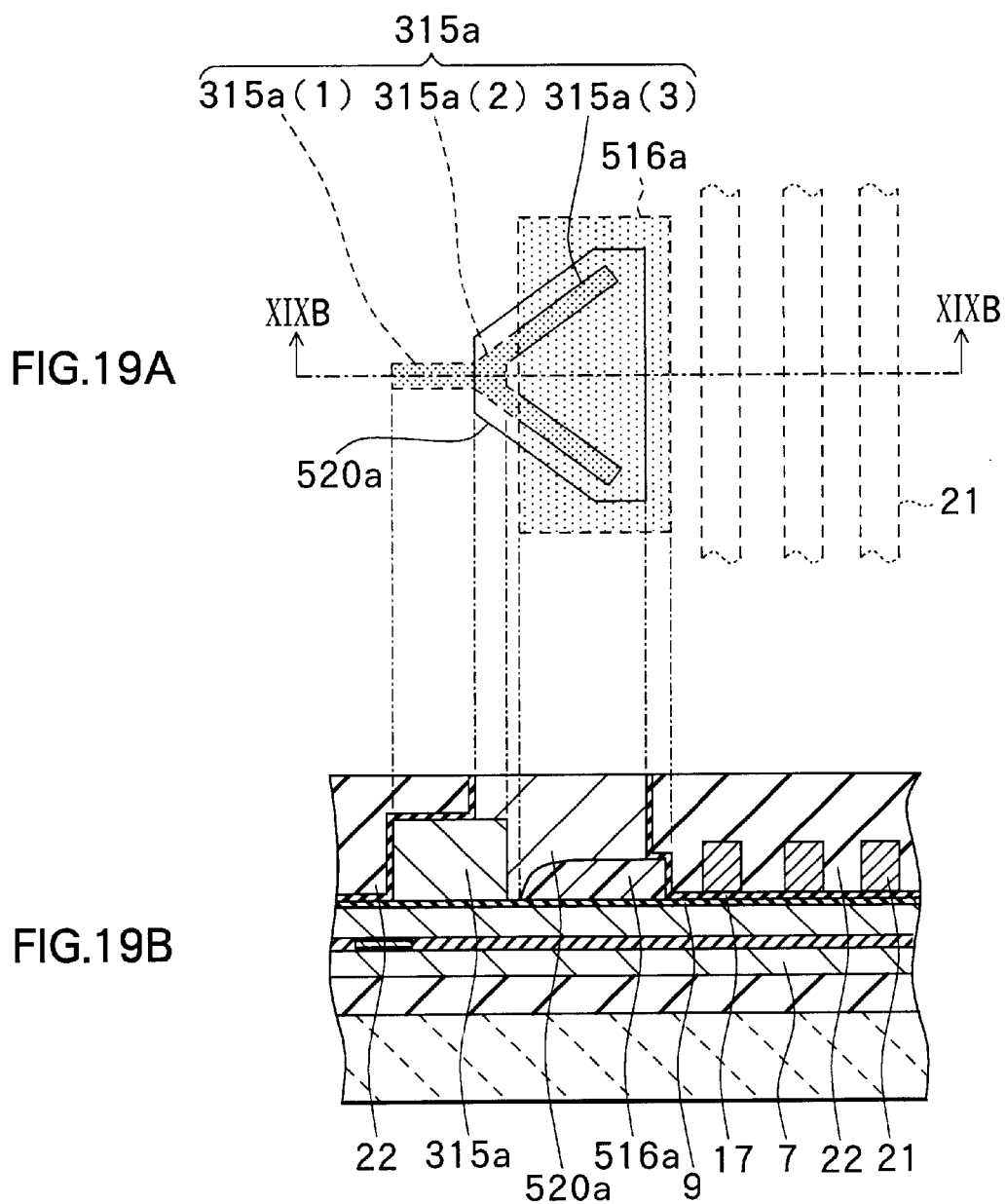

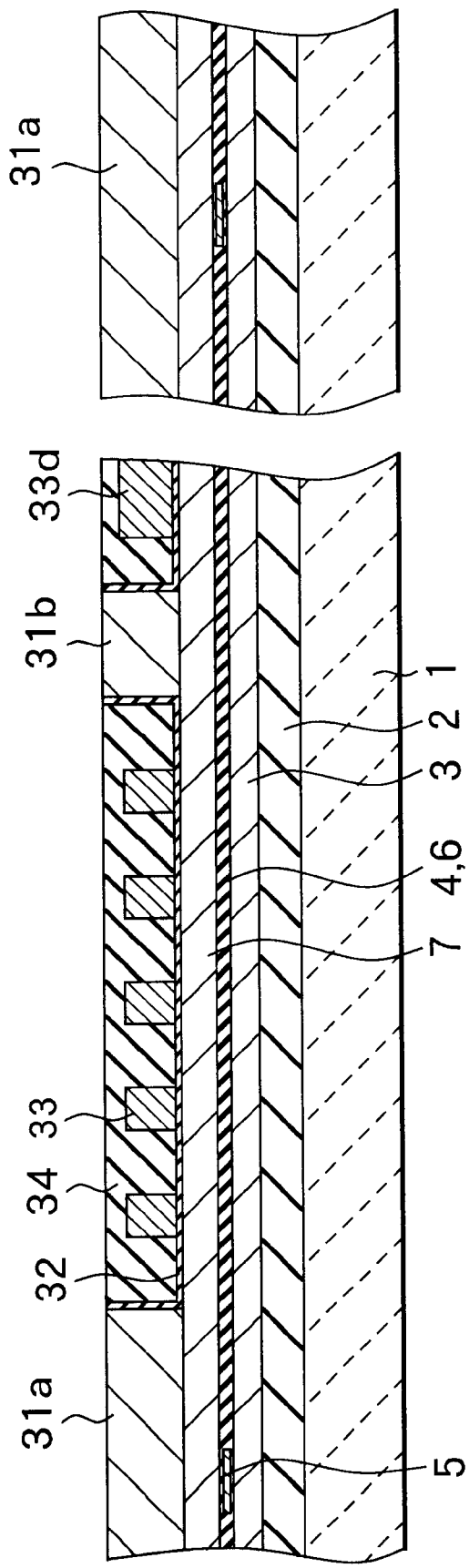

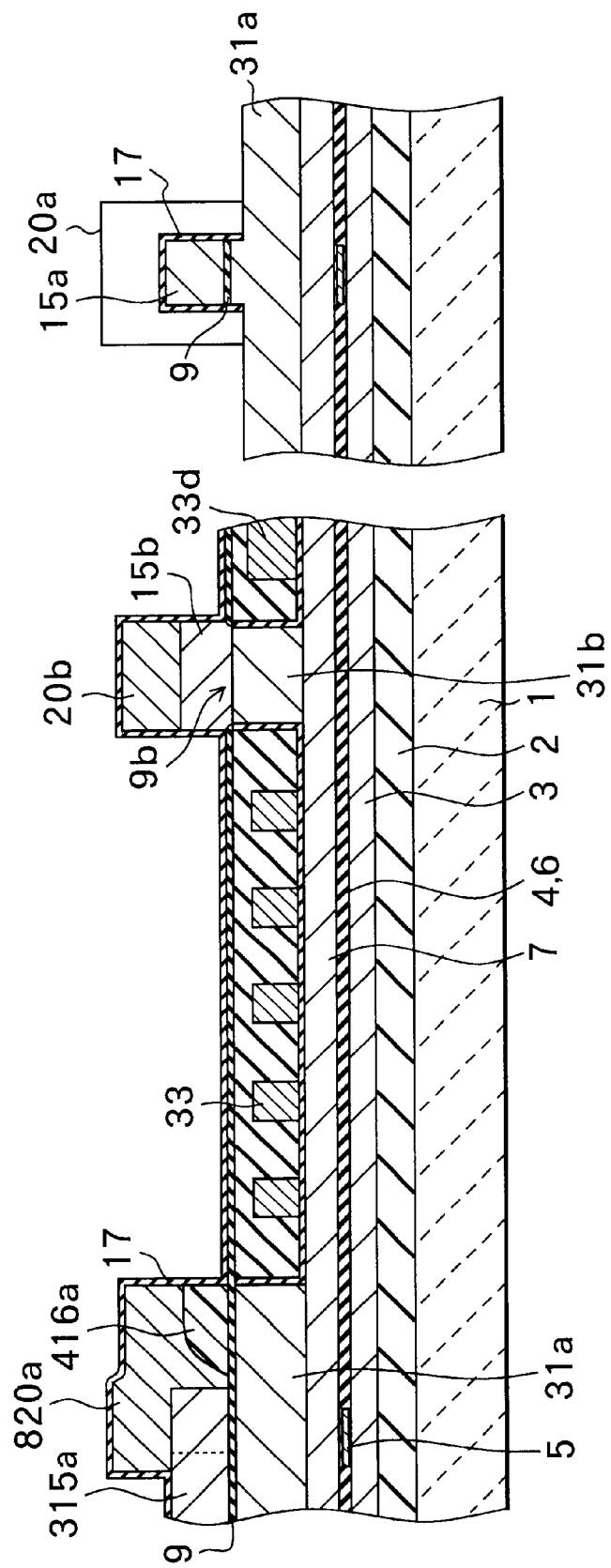

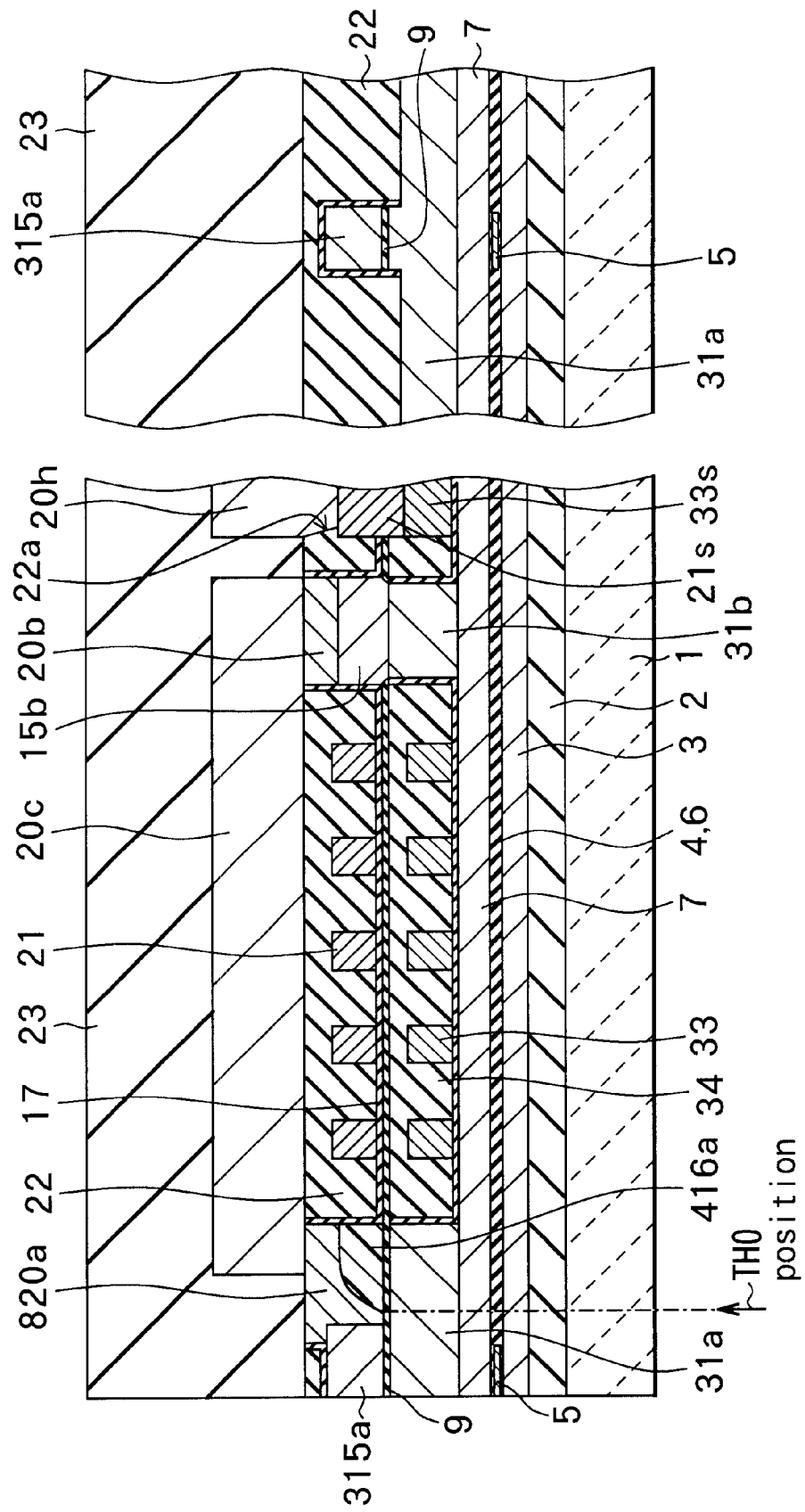

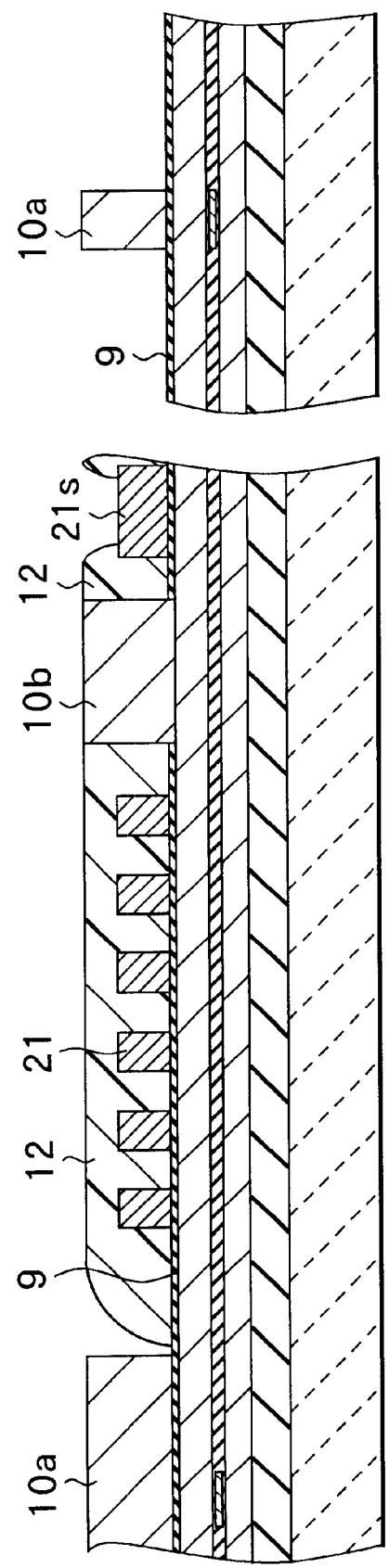

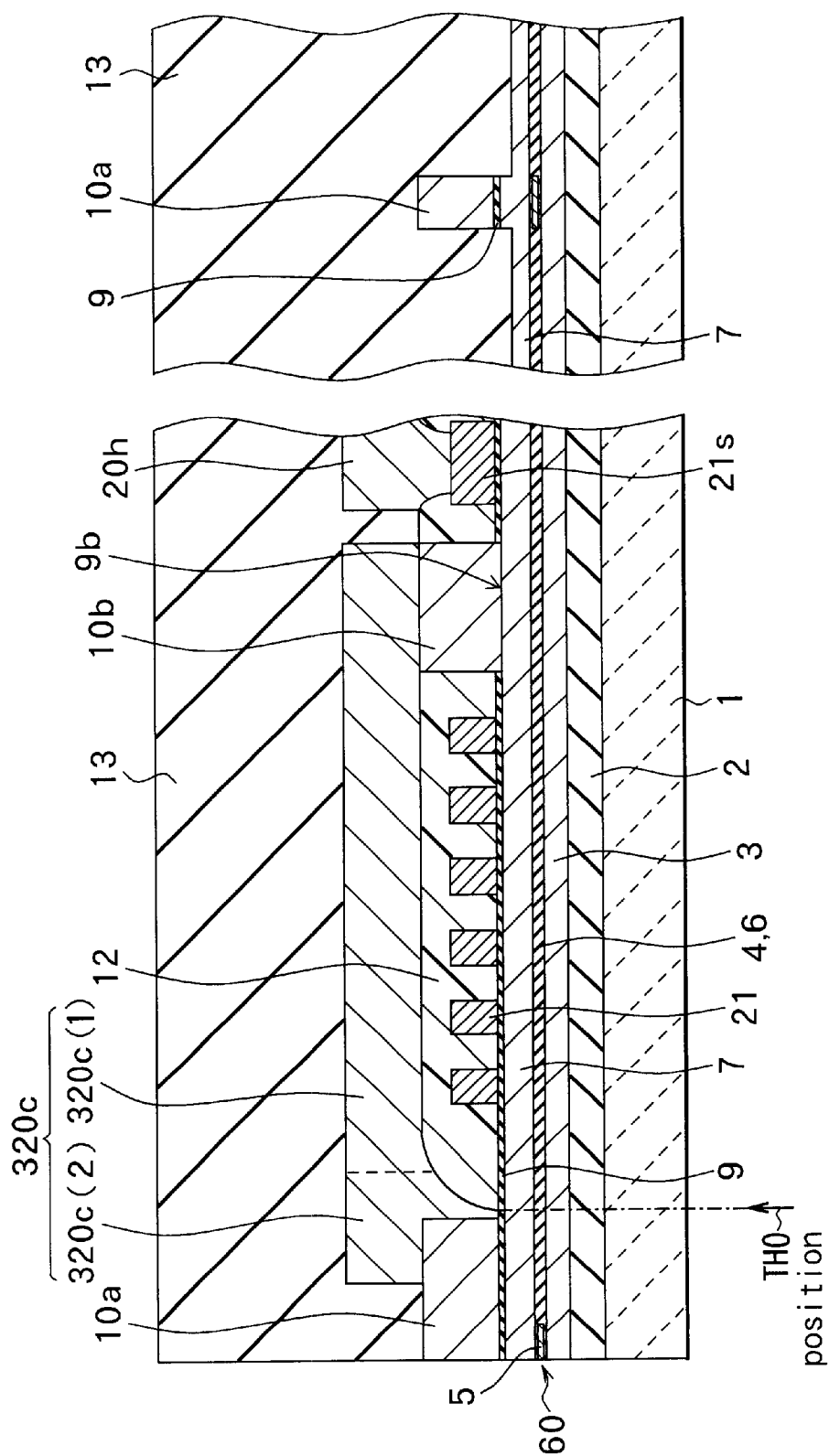

THIN FILM MAGNETIC HEAD AND METHOD OF MANUFACTURING THE SAME

BACKGROUND OF THE INVENTION

1. Field of the Invention

The invention relates to a thin film magnetic head having at least an inductive magnetic transducer for writing and a method of manufacturing the same.

2. Description of the Related Art

Recently, an improvement in performance of a thin film magnetic head has been sought in accordance with an increase in a surface recording density of a hard disk device. A composite thin film magnetic head is widely used as the thin film magnetic head. The composite thin film magnetic head has a laminated structure comprising a recording head having an inductive magnetic transducer for writing and a reproducing head having a magnetoresistive (hereinafter referred to as MR) element for reading. MR elements include an AMR element utilizing an anisotropic magnetoresistive (AMR) effect and a GMR element utilizing a giant magnetoresistive (GMR) effect. Methods of improving the performance of the reproducing head include a method in which an MR film is changed from an AMR film to a material having excellent sensitivity to magnetic resistance, such as a GMR film; a method in which a pattern width of the MR film, particularly, an MR height is appropriately set; and so on. The MR height means a length (height) of the MR element between the end thereof close to an air bearing surface and the opposite end thereof. The MR height is controlled in accordance with an amount of air bearing surface to be polished in working the air bearing surface. The air bearing surface means the surface of the thin film magnetic head facing a magnetic recording medium. The air bearing surface is sometimes called a track surface.

On the other hand, the improvement in the performance of the recording head is also sought in accordance with the improvement in the performance of the reproducing head. Factors for determining the performance of the recording head include a throat height (TH). The throat height means the length (height) of a magnetic pole portion between the air bearing surface and an edge of an insulating layer for electrically isolating thin film coils for generating a magnetic flux. A reduction in the throat height is desired for the improvement in the performance of the recording head. The throat height is also controlled in accordance with the amount of air bearing surface to be polished in working the air bearing surface.

The increase in a recording density of the performance of the recording head requires the increase in a track density of the magnetic recording medium. For this purpose, it is necessary to implement the recording head having a narrow track structure. In this structure, a bottom pole and a top pole are formed on the bottom and the top of a write gap, respectively, with the write gap sandwiched therebetween, and the bottom and top poles have a narrow width of from a few microns to the submicron order on the air bearing surface. Technology for fabricating a semiconductor is used in order to achieve this structure.

One example of the method of manufacturing the composite thin film magnetic head will be now described as one example of the method of manufacturing the thin film magnetic head of the related art with reference to FIGS. 32 to 37.

In this manufacturing method, first, as shown in FIG. 32, an insulating layer 102 made of alumina ($Al_2O_3$), for example, is deposited with a thickness of about 5 $\mu$m to 10 $\mu$m on a substrate 101 made of altic ($Al_2O_3$ and TiC), for example. Then, a lower shield layer 103 for the reproducing head is formed on the insulating layer 102. Then, alumina, for example, is sputter deposited with a thickness of 100 nm to 200 nm on the lower shield layer 103, whereby a shield gap film 104 is formed. Then, an MR film 105 for constituting the MR element for reproducing is formed with a thickness of tens of nanometers on the shield gap film 104. The MR film 105 is patterned into a desired shape by high-accuracy photolithography. Then, a lead layer (not shown) for functioning as a lead electrode layer to be electrically connected to the MR film 105 is formed on both sides of the MR film 105. Then, a shield gap film 106 is formed on the lead layer, the shield gap film 104 and the MR film 105, whereby the MR film 105 is embedded in the shield gap films 104 and 106. Then, an upper shield-cum-bottom pole (hereinafter referred to as a bottom pole) 107 made of a magnetic material for use in both of the reproducing and recording heads, e.g., permalloy (NiFe) is formed on the shield gap film 106.

Then, as shown in FIG. 33, a write gap layer 108 made of an insulating film, e.g., an alumina film is formed on the bottom pole 107. Thin film coil 110 made of, for example, copper (Cu) for an inductive recording head is formed on the write gap layer 108 by plating method, for example. Then, a photoresist layer 111 is formed into a predetermined pattern by the high-accuracy photolithography so that the thin film coil 110 may be coated with the photoresist layer 111. Then, heat treatment takes place at a temperature of, for instance, 250° C. in order to provide planarization of the thin film coil 110 and insulation among the thin film coil 110. Then, thin film coil 112 made of, for example, copper is formed on the photoresist layer 111. A photoresist layer 113 is formed so as to cover the thin film coil 112.

Then, as shown in FIG. 34, the write gap layer 108 is partially etched at the rear of the thin film coils 110 and 112 (on the right side in FIG. 34) in order to form a magnetic path, whereby an opening 108a is formed. Then, an upper yoke-cum-top pole (hereinafter referred to as a top pole) 114 made of the magnetic material for the recording head, e.g., permalloy is selectively formed on the write gap layer 108 and a photoresist layer 113. The top pole 114 is in contact with and magnetically coupled to the bottom pole 107 in the above-mentioned opening 108a. Then, the write gap layer 108 and the bottom pole 107 are etched by about 0.5 $\mu$m by means of ion milling using the top pole 114 as a mask. Then, an overcoat layer 115 made of alumina, for example, is formed on the top pole 114. Finally, a slider is machined, whereby a track surface (air bearing surface) 120 of the recording head and the reproducing head is formed. As a result, the thin film magnetic head is completed.

FIGS. 35 to 37 show the structure of the completed thin film magnetic head. FIG. 35 shows a cross section of the thin film magnetic head perpendicular to the air bearing surface 120. FIG. 36 shows an enlarged view of the cross section of the magnetic pole portion parallel to the air bearing surface 120. FIG. 37 shows a plan view. FIG. 34 corresponds to the cross section along line XXXIVA—XXXIVA of FIG. 37. The overcoat layer 115 is not shown in FIGS. 35 to 37.

To improve the performance of the thin film magnetic head, it is important to precisely form a throat height TH, an apex angle θ, a pole width P2W and a pole length P2L shown in FIGS. 35 and 36. The apex angle θ means the angle between a line tangent to side surfaces of the photoresist layers 109, 111 and 113 close to the track surface and an upper surface of the top pole 114. The pole width P2W defines a recording track width on the recording medium. The pole length P2L represents the thickness of the magnetic pole. In FIGS. 35 and 37, a 'TH0 position' means the edge of the insulating layer (the photoresist layer 109) under the thin film coils 110, close to the track surface. The TH0 position indicates a reference position 0 of the throat height TH.

The structure, in which the respective partial side walls of the top pole 114, the write gap layer 108 and the bottom pole 107 are vertically formed in self-alignment as shown in FIG. 36, is called a trim structure. This trim structure allows a prevention of the increase in an effective track width resulting from a spread of the magnetic flux generated during the writing of data on the narrow track. As shown in FIG. 36, a lead layer 122 for functioning as the lead electrode layer to be electrically connected to the MR film 105 is formed on both sides of the MR film 105. The lead layer 121 is not shown in FIGS. 32 to 35.

FIG. 38 shows a plan structure of the top pole 114. As shown in this drawing, the top pole 114 has a yoke portion 114a occupying most of the top pole 114, and a pole chip portion 114b having a substantially uniform width W100 as the pole width P2W. An outer edge of the yoke portion 114a forms an angle a with the surface parallel to the air bearing surface 120 at a coupling portion between the yoke portion 114a and the pole chip portion 114b. Moreover, the outer edge of the pole chip portion 114b forms an angle β with the surface parallel to the air bearing surface 120 at the above-mentioned coupling portion. In this case, α is about 45 degrees for example, and β is 90 degrees. The width of the pole chip portion 114b defines the recording track width on the recording medium. The pole chip portion 114b includes a portion F at the front of the TH0 position (close to the air bearing surface 120) and a portion R at the rear of the TH0 position (close to the yoke portion 114a). As can be seen from FIG. 35, the portion F extends on the flat write gap layer 108, and the portion R and the yoke portion 114a extend on a coil portion (hereinafter referred to as an "apex portion") which is coated with the photoresist layers 109, 111 and 113 and rises mountainously.

The shape of the top pole is described in Japanese Patent Laid-open No. 8-249614, for example.

The pole width P2W requires to be precisely formed in order to determine the track width of the recording head. More particularly, microfabrication for reducing the pole width P2W of the top pole to 1.0 μm or less in dimension has been recently required in order to enable recording at high surface density, that is, in order to form the recording head having the narrow track structure.

Frame plating method is used as the method of forming the top pole, as disclosed in Japanese Patent Laid-open No. 7-262519, for instance. To form the top pole 114 by using the frame plating method, a thin electrode film made of permalloy, for example, is first formed over the apex portion by sputtering, for example. Then, the electrode film is coated with a photoresist. The photoresist is patterned by photolithography process, whereby a frame for plating is formed. Then, the top pole 114 is formed by the plating method using the preformed electrode film as a seed layer.

By the way, the height of the apex portion differs from that of the remaining portion by 3 μm to 4 μm or more, for example. This apex portion is coated with the photoresist with a thickness of 3 μm to 4 μm. Assuming that the photoresist on the apex portion needs a film thickness of 3 μm or more at the minimum, a photoresist film of, for example, 4 μm to 6 μm or more thick is formed under the apex portion because the fluid photoresist collects at the lower place.

As described above, a formation of the narrow track requires the formation of a frame pattern of about 1.0 μm wide by the photoresist film. That is, a micro-pattern of 1.0 μm or less in width must be formed by the photoresist film of 4 μm to 6 μm or more in thickness. However, it is extremely difficult for a manufacturing process to form such a thick photoresist pattern with a narrow pattern width.

Moreover, during exposure for the photolithography, a light for the exposure is reflected by an underlying electrode film serving as the seed layer. The photoresist is exposed to this reflected light. This causes deformation or the like in the photoresist pattern. Thus, a sharp and precise photoresist pattern cannot be obtained. Consequently, the top pole cannot be formed into a desired shape, e.g., the side wall of the top pole is rounded in shape. More particularly, when an attempt is made to further reduce the pole width P2W to W100A as shown in FIG. 39, it is more difficult to obtain this desired width W100A. This occurs for the following reason. In the portion R of the pole chip portion 114b extending on the apex portion, the light, which is reflected and returned by the underlying electrode film, includes not only the vertically reflected light but also the light that is obliquely or transversely reflected from an inclined surface of the apex portion. These reflected lights have an influence upon the exposure of the photoresist layer. As a result, a photoresist pattern width for defining the pole width P2W is larger than an intended value. Therefore, the portion R has the shape shown by a solid line in FIG. 39. The width of the portion F of the pole chip portion 114b at the front of the TH0 position is a very important factor for defining the track width on the recording medium. Thus, an intended minute track width cannot be obtained when the width of the portion F is larger than the above-mentioned value W100A.

Such a problem similarly exists in the magnetic head described in Japanese Patent Laid-open No. 8-249614 mentioned above. In the magnetic head described in this publication, the pole width is gradually changed from the TH0 position toward the yoke portion. Thus, the light, which is obliquely or transversely reflected from the inclined surface of the apex portion, has the influence upon the exposure of the photoresist layer. Due to this influence, the width of the portion at the front of the TH0 position cannot be precisely controlled.

Moreover, as shown in FIG. 39, the portion R of the pole chip portion 114b between the TH0 position and the coupling portion to the yoke portion 114a has substantially the same width as the width of the portion F at the front of the TH0 position. Thus, the portion R has a small cross-sectional area. Thus, the magnetic flux from the yoke portion 114a is saturated in the portion R. Thus, the magnetic flux cannot sufficiently reach to the portion F for defining the track width. Therefore, overwrite properties, i.e., the properties of overwriting the data on the data already written on the recording medium is as low as about 10 dB to 20 dB, for example. Consequently, there is a problem of being unable to ensuring sufficient overwrite properties.

The invention is designed to overcome the foregoing problems. It is an object of the invention to provide a thin film magnetic head and a method of manufacturing the same, which can precisely control the pole width and can obtain sufficient overwrite properties even when the pole width is reduced.

SUMMARY OF THE INVENTION

A thin film magnetic head of the invention comprises: two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers, wherein one of the two magnetic poles includes a first magnetic layer portion extending away from the recording-medium-facing surface along the gap layer and having a uniform width for defining a recording track width on the recording medium, the insulating layer includes a first insulating layer having a reference edge for defining the edge on a recording-medium-facing surface side of the insulating layer and formed in a region between the first magnetic layer portion and the thin film coils along the gap layer, and a second insulating layer for embedding the thin film coils, and one of the two magnetic layers including the one of the two magnetic poles includes a second magnetic layer portion covering at least the first insulating layer and magnetically coupled to the first magnetic layer portion.

A method of manufacturing a thin film magnetic head of the invention is a method of manufacturing a thin film magnetic head having two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers. The method comprises the steps of forming one of the two magnetic poles so as to include a first magnetic layer portion extending away from the recording-medium-facing surface along the gap layer and having a uniform width for defining a recording track width on the recording medium; forming the insulating layer so as to include a first insulating layer and a second insulating layer, the first insulating layer having a reference edge for defining the edge on a recording-medium-facing surface side of the insulating layer, the first insulating layer being located in a region between the first magnetic layer portion and the thin film coils along the gap layer, the second insulating layer embedding the thin film coil; and forming one of the two magnetic layers including the one of the two magnetic poles so as to include a second magnetic layer portion covering at least the first insulating layer and magnetically coupled to the first magnetic layer portion.

In the thin film magnetic head or the method of manufacturing the same of the invention, the recording track width on the recording medium is defined by the first magnetic layer portion included in one of the two magnetic poles and having a uniform width. The insulating layer for insulating the thin film coils includes the first insulating layer and the second insulating layer. The first insulating layer is formed in the region between the first magnetic layer portion and the thin film coils along the gap layer. The surface of the region near the edge on a recording-medium-facing surface side of the first insulating layer forms a slope. The edge of the first insulating layer serves as the reference edge for defining the edge on a recording-medium-facing surface side of the insulating layer for insulating the thin film coils. The second insulating layer is used to embed the thin film coils. One of the two magnetic layers, which includes the one magnetic pole, includes the second magnetic layer portion. At least the first insulating layer covers the second magnetic layer portion. The second magnetic layer portion is magnetically coupled to the first magnetic layer portion.

In the thin film magnetic head or the method of manufacturing the same of the invention, the one of the two magnetic poles may further include a third magnetic layer portion magnetically coupled to the first magnetic layer portion, extending in a direction opposite to the recording-medium-facing surface and having a width greater than the width of the first magnetic layer portion. In this case, it is preferable that the third magnetic layer portion is surrounded on at least three sides by the second magnetic layer portion. Furthermore, the first magnetic layer portion may be surrounded on at least three sides by the second magnetic layer portion.

Moreover, in the thin film magnetic head or the method of manufacturing the same of the invention, it is preferable that the magnetic pole including the first magnetic layer portion and the third magnetic layer portion has a T-shaped plan shape. Alternatively, it is preferable that the width of the third magnetic layer portion is gradually increased as it is farther from the recording-medium-facing surface.

Moreover, in the thin film magnetic head or the method of manufacturing the same of the invention, it is preferable that the first magnetic layer portion and the third magnetic layer portion extend in contact with the gap layer. In this case, it is preferable that the first magnetic layer portion and the third magnetic layer portion are formed through dry process and the second magnetic layer portion is formed through electroplating process. Furthermore, in this case, the first magnetic layer portion and the third magnetic layer portion can be made of a material containing iron nitride, and the second magnetic layer portion can be made of a material containing nickel and iron.

Moreover, in the thin film magnetic head or the method of manufacturing the same of the invention, the one of the two magnetic poles may further include at least two fourth magnetic layer portions magnetically coupled to the third magnetic layer portion, separated in a direction of the recording track width, and extending in the region opposite to the recording-medium-facing surface of the third magnetic layer portion. The fourth magnetic layer portions may extend in contact with the gap layer, or the fourth magnetic layer portions may extend on the first insulating layer. Moreover, each of the fourth magnetic layer portions may be surrounded on at least three sides by the second magnetic layer portion.

Moreover, in the thin film magnetic head or the method of manufacturing the same of the invention, the first insulating layer and the second insulating layer may be integrally formed by the same process using the same material.

Moreover, in the thin film magnetic head or the method of manufacturing the same of the invention, the one of the two magnetic layers may further include a fifth magnetic layer portion partly covering the thin film coils with the second insulating layer in between. Furthermore, in this case, the second magnetic layer portion and the fifth magnetic layer portion may be integrally formed by the same process using the same material.

A method of manufacturing a thin film magnetic head according to another aspect of the invention is a method of manufacturing a thin film magnetic head having two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers. The method comprises the steps of forming one of the two magnetic poles on the gap layer so as to include a portion extending away from the recording-medium-facing surface and having a uniform width for defining a recording track width on the recording medium;

forming a reference-defining insulating layer in the region opposite to the recording-medium-facing surface on the gap layer, the reference-defining insulating layer constituting a part of the insulating layer and having a reference edge for defining the edge on a recording-medium-facing surface side of the insulating layer, the surface of the reference-defining insulating layer near the reference edge forming a slope; forming a coupling magnetic layer so as to cover at least the reference-defining insulating layer, the coupling magnetic layer constituting a part of one of the two magnetic layers including the one of the two magnetic poles, and being magnetically coupled to the magnetic pole formed on the gap layer; forming the thin film coils along the gap layer; and embedding the thin film coils in a embedding insulating layer constituting another part of the insulating layer.

In the method of manufacturing the thin film magnetic head according to another aspect of the invention, first, one of the two magnetic poles is formed on the gap layer. The one of the two magnetic poles includes the portion extending away from the recording-medium-facing surface and having a uniform width for defining the recording track width on the recording medium. Then, the reference-defining insulating layer constituting a part of the insulating layer for insulating the thin film coils is formed in the region opposite to the recording-medium-facing surface on the gap layer. The reference-defining insulating layer has the reference edge for defining the edge on a recording-medium-facing surface side of the insulating layer. The surface of the reference-defining insulating layer near the reference edge forms a slope. Then, the coupling magnetic layer constituting a part of one of the two magnetic layers including the one of the two magnetic poles is formed so as to cover the reference-defining insulating layer. The coupling magnetic layer is magnetically coupled to the magnetic pole formed on the gap layer. Then, the thin film coils are formed along the gap layer. The thin film coils are embedded in the embedding insulating layer constituting another part of the insulating layer.

In the method of manufacturing the thin film magnetic head according to another aspect of the invention, the magnetic pole can be formed through dry process, and the coupling magnetic layer can be formed through electroplating process. In this case, it is preferable that the one of the two magnetic poles is made of a material containing iron nitride and the coupling magnetic layer is made of a material containing nickel and iron.

In the method of manufacturing the thin film magnetic head according to another aspect of the invention, the method further comprises the steps of flattening the surfaces of at least both of the magnetic pole and the embedding insulating layer after forming the embedding insulating layer; and forming a yoke magnetic layer so as to partly covering the thin film coils with the flattened embedding insulating layer in between, the yoke magnetic layer constituting another part of the magnetic layer including the one of the two magnetic poles and being magnetically coupled to the one of the magnetic poles.

Other and further objects, features and advantages of the invention will appear more fully from the following description.

BRIEF DESCRIPTION OF THE DRAWINGS

FIGS. 2A and 2B are cross sectional views for describing the process following the process of FIGS. 1A and 1B;

FIGS. 3A and 3B are cross sectional views for describing the process following the process of FIGS. 2A and 2B;

FIGS. 4A and 4B are cross sectional views for describing the process following the process of FIGS. 3A and 3B;

FIGS. 19A and 19B are a plan view and a cross sectional view of the method of manufacturing the thin film magnetic head according to a further modification of the first embodiment of the invention, respectively;

FIGS. 24A and 24B are cross sectional views for describing the process following the process of FIGS. 23A and 23B;

FIGS. 25A and 25B are cross sectional views for describing the process following the process of FIGS. 24A and 24B;

FIGS. 27A and 27B are cross sectional views for describing the process following the process of FIGS. 26A and 26B;

FIGS. 29A and 29B are cross sectional views for describing the process following the process of FIGS. 28A and 28B;

FIGS. 30A and 30B are cross sectional views for describing the process following the process of FIGS. 29A and 29B;

DETAILED DESCRIPTION OF THE PREFERRED EMBODIMENTS

Embodiments of the invention will be described in detail below with reference to the accompanying drawings.

First Embodiment
[A Method of Manufacturing a Thin Film Magnetic Head According to a First Embodiment]

First, a method of manufacturing a thin film magnetic head according to a first embodiment of the invention will be described with reference to FIGS. 1A to 12. In this embodiment, a composite thin film magnetic head comprising both of a recording head and a reproducing head will be described as an example. Since the thin film magnetic head according to this embodiment is embodied by the method of manufacturing the thin film magnetic head according to this embodiment, the thin film magnetic head will be described in conjunction with the method of manufacturing the thin film magnetic head.

Figures 5A, 5B:
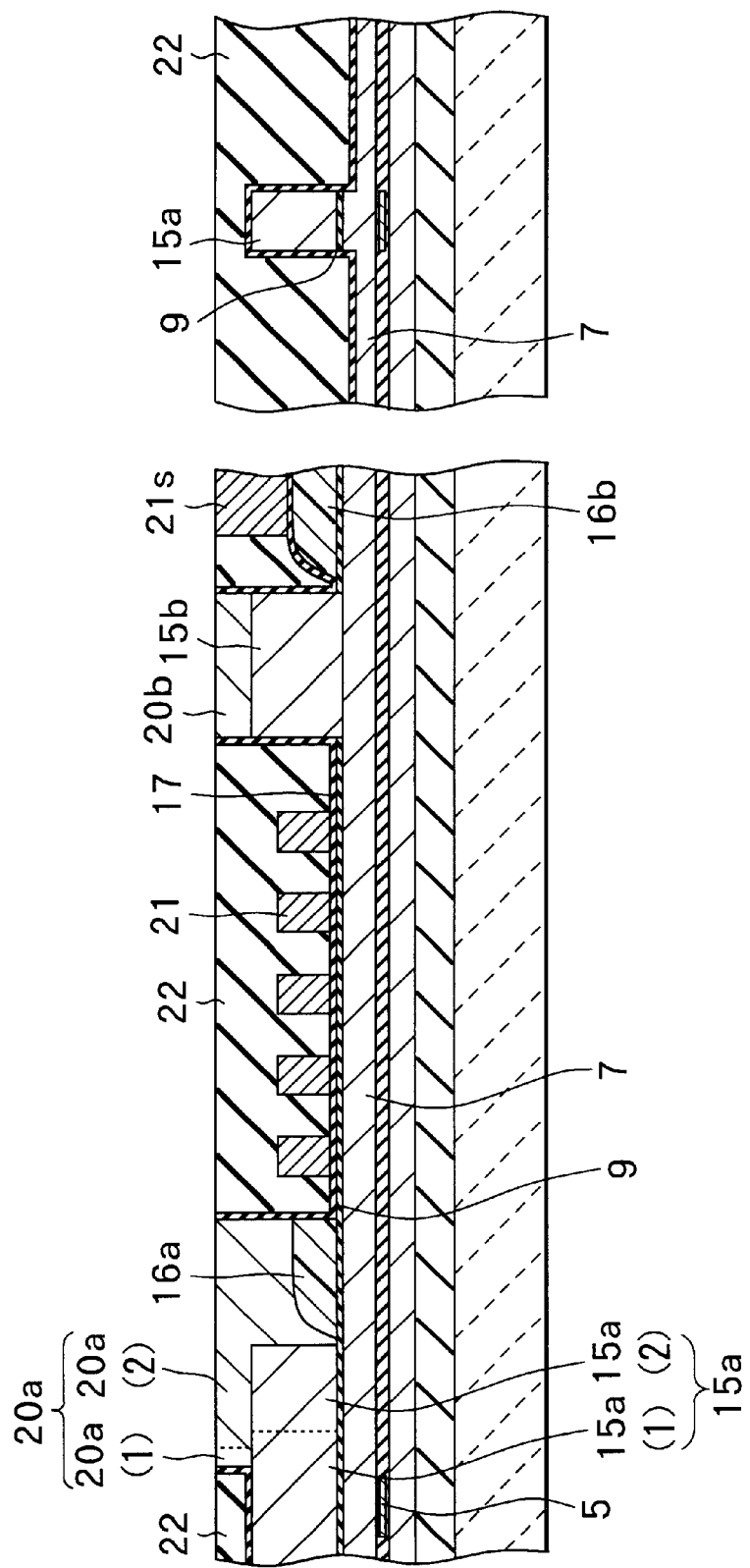
FIGS. 5A and 5B are cross sectional views for describing the process following the process of FIGS. 4A and 4B.
Figures 6A, 6B:
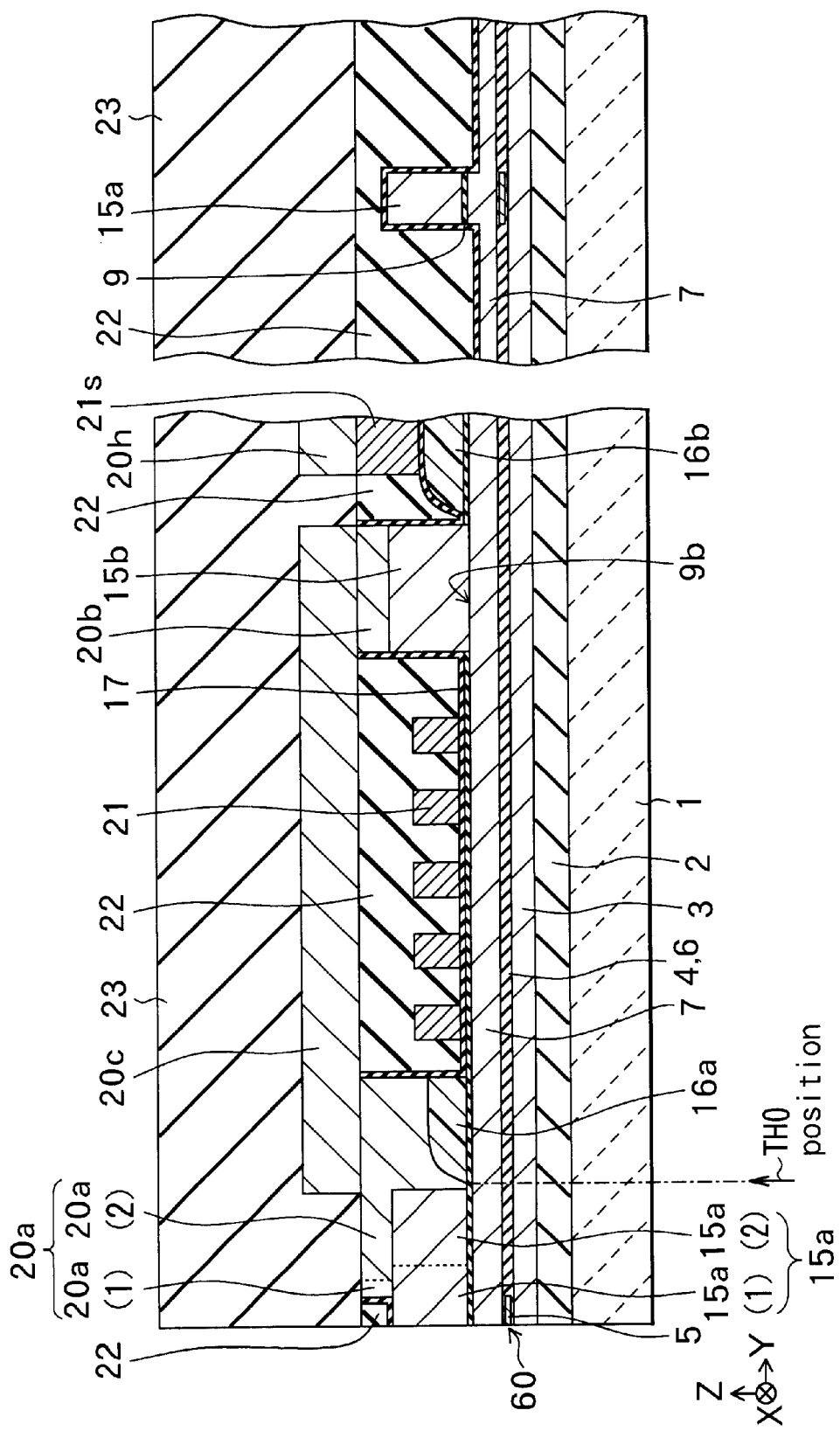
FIGS. 6A and 6B are cross sectional views for describing the process following the process of FIGS. 5A and 5B.
Figure 7:
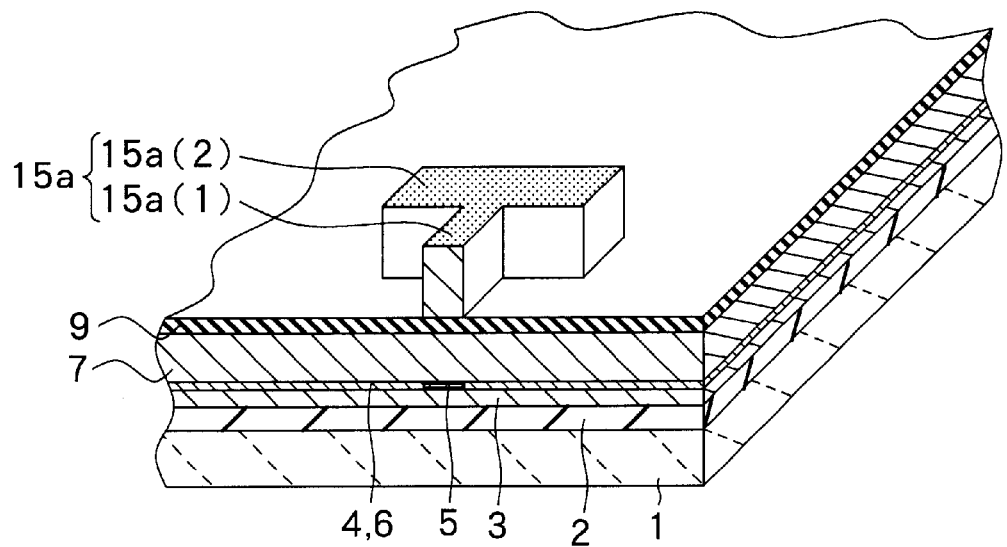
FIG. 7 is a perspective view corresponding to cross sectional views shown in FIGS. 1A and 1B.
Figure 9:
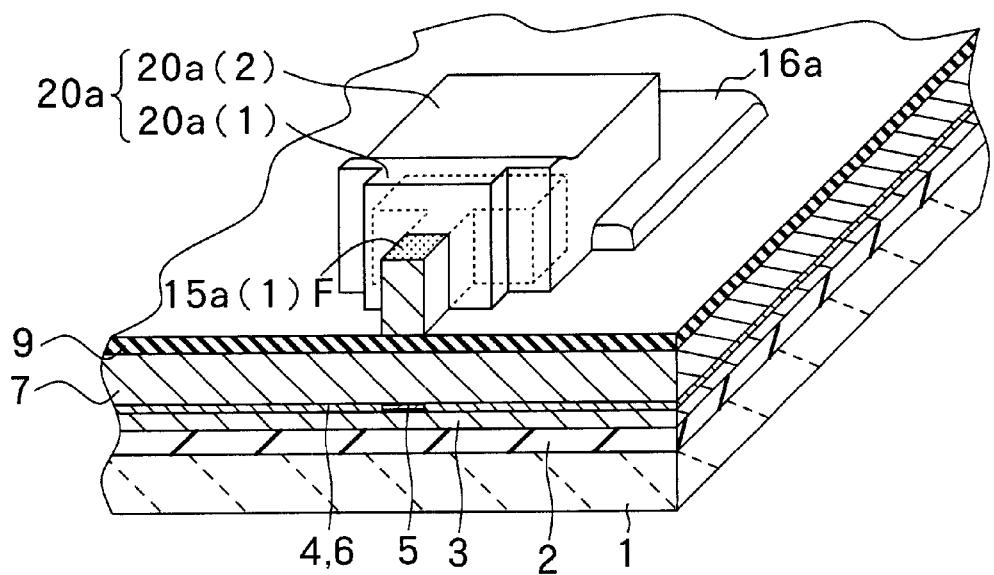
FIG. 9 is a perspective view corresponding to cross sectional views shown in FIGS. 2A and 2B.
Figure 10:
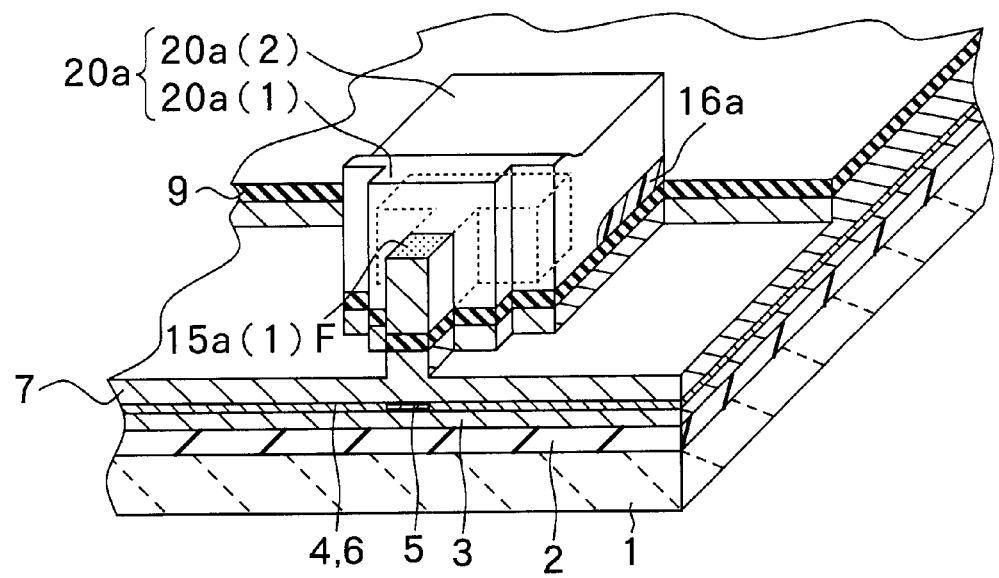
FIG. 10 is a perspective view corresponding to cross sectional views shown in FIGS. 3A and 3B.
Figure 11:
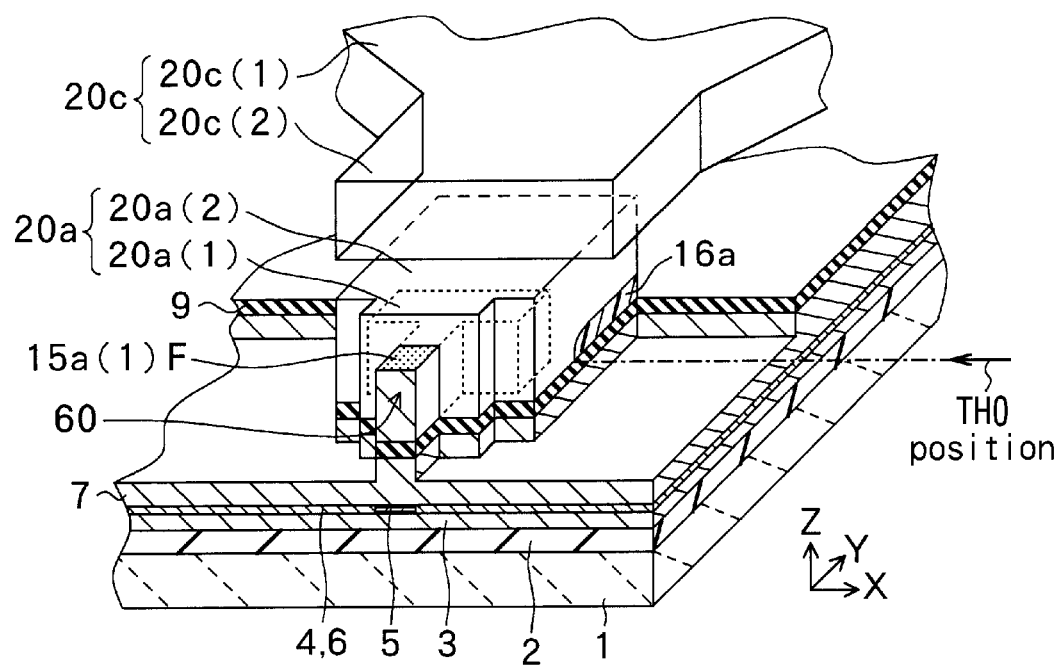
FIG. 11 is a perspective view corresponding to cross sectional views shown in FIGS. 6A and 6B.

FIGS. 1A, 2A, 3A, 4A, 5A and 6A show a cross section perpendicular to an air bearing surface. FIGS. 1B, 2B, 3B, 4B, 5B and 6B show the cross section of a magnetic pole portion parallel to the air bearing surface. FIGS. 7 to 11 are perspective views corresponding to a main manufacturing process. FIG. 7 corresponds to a state shown in FIGS. 1A and 1B. FIG. 9 corresponds to the state shown in FIGS. 2A and 2B. FIG. 10 corresponds to the state shown in FIGS. 3A and 3B. FIG. 11 corresponds to the state shown in FIGS. 6A and 6B. An insulating film 17 in FIGS. 3A and 3B is not shown in FIG. 9. Thin film coils 21, an insulating layer 22 and an overcoat layer 23 in FIGS. 6A and 6B are not shown in FIG. 11.

Figures 1A, 1B:
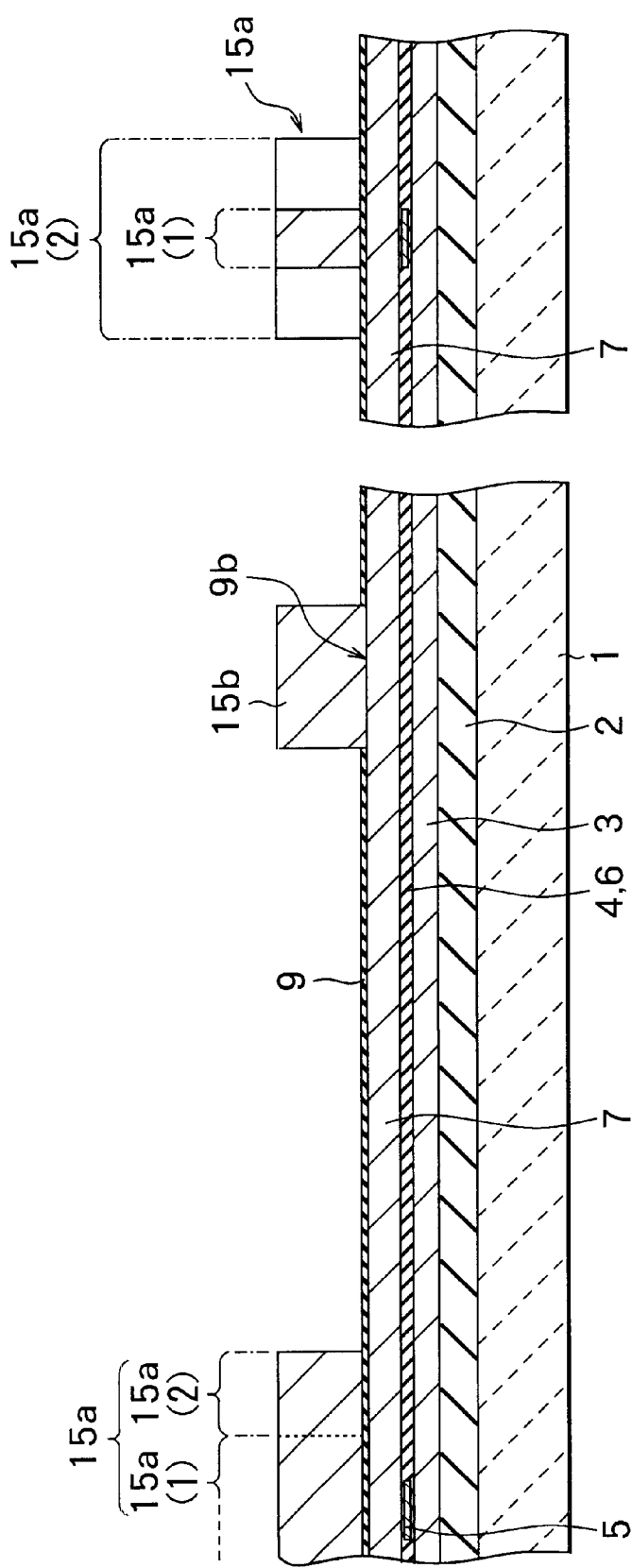
FIGS. 1A and 1B are cross sectional views for describing one process of a method of manufacturing a thin film magnetic head according to a first embodiment of the invention.

In the following description, a distance along a direction parallel to the air bearing surface, e.g., a horizontal direction in FIG. 1B is indicated by a "width". The distance along the direction perpendicular to the air bearing surface (e.g., the horizontal direction in FIG. 1A) is indicated by a "length". Moreover, the distance along a vertical direction in FIGS. 1A and 1B, for example, is indicated by a "thickness" or a "height". Furthermore, the side close to the air bearing surface along a longitudinal direction (e.g., the left side in FIG. 1A) is indicated by the "front (or frontward)" side. The side far from the air bearing surface (e.g., the right side in FIG. 1A) is indicated by the "rear (or rearward)" side.

In the manufacturing method according to this embodiment, first, as shown in FIGS. 1A and 1B and FIG. 7, an insulating layer 2 made of alumina ($Al_2O_3$), for example, is deposited with a thickness of about 3 $\mu$m to 5 $\mu$m on a substrate 1 made of altic ($Al_2O_3$ and TiC), for example. Then, permalloy (NiFe) is selectively formed with a thickness of about 3 $\mu$m on the insulating layer 2 by plating method using a photoresist film as a mask, whereby a lower shield layer 3 for the reproducing head is formed.

Then, as shown in the drawings, alumina, for example, is sputter deposited with a thickness of 100 nm to 200 nm on the lower shield layer 3, whereby a shield gap film 4 is formed. Then, an MR film 5 for constituting an MR element for reproducing is formed with a thickness of tens of nanometers or less on the shield gap film 4. The MR film 5 is formed into a desired shape by high-accuracy photolithography. Then, a lead layer (not shown) for functioning as a lead electrode layer to be electrically connected to the MR film 5 is formed on both sides of the MR film 5. Then, a shield gap film 6 is formed on the lead layer, the shield gap film 4 and the MR film 5, whereby the MR film 5 is embedded in the shield gap films 4 and 6. Then, an upper shield-cum-bottom pole (hereinafter referred to as a "bottom pole") 7 made of permalloy, for example, is selectively formed with a thickness of about 3 $\mu$m to 4 $\mu$m on the shield gap film 6 by electroplating method, for example.

Then, as shown in the drawings, a write gap layer 9 made of alumina, for example, is formed with a thickness of about 0.15 $\mu$m to 0.3 $\mu$m over the whole surface. Then, the write gap layer 9 is partially etched, whereby an opening 9b is formed in order to form a magnetic path in a region at the rear of the region in which the thin film coils 21 are formed in the following process.

Figure 12:
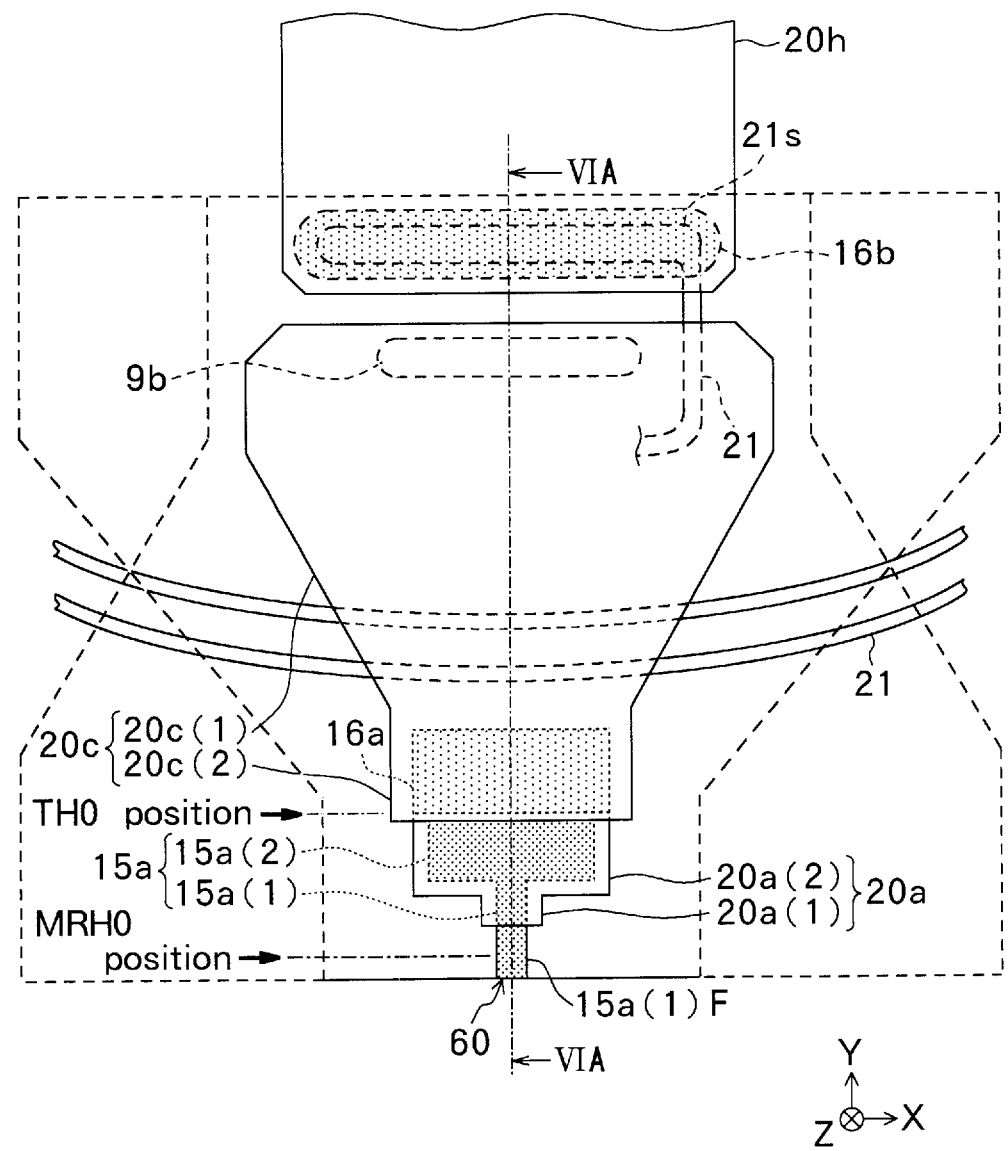
FIG. 12 is a plan view of a structure of the thin film magnetic head according to the first embodiment of the invention.

Then, as shown in the drawings, a top pole chip 15a for constituting a part of a top pole is formed with a thickness of about 2 $\mu$m to 3 $\mu$tm on the flat write gap layer 9 in the region at the front of the region in which the thin film coils 21 are formed in the following process. The top pole chip 15a has a T-shaped plan shape as shown in FIG. 7 and FIG. 12 discussed below. The top pole chip 15a includes an end portion 15a(1) having a uniform width for defining a recording track width on a recording medium (not shown), and a wide portion 15a(2) having the width larger than the width of the end portion 15a(1). At the same time that the top pole chip 15a is formed, a magnetic path connection portion 15b is formed in the opening 9b.

A material having a high saturation magnetic flux density, such as a permalloy (NiFe) alloy or an iron nitride (FeN) alloy is used as the top pole chip 15a and the magnetic path connection portion 15b. For example, the electroplating method that is wet process, sputtering deposition method that is dry process, or the like can be used to form the top pole chip 15a and the magnetic path connection portion 15b. More particularly, in this process, the top pole chip 15a can be also deposited by sputtering method using the iron nitride alloy because an underlying layer is the flat write gap layer 9. When the iron nitride alloy is deposited on an inclined surface by the dry process such as sputtering, crystalline anisotropy occurs and thus magnetic flux transmittance is reduced. However, when the iron nitride alloy is deposited on a flat surface, there is little tendency to cause such inconvenience. When the electroplating method is used, such a problem of anisotropy does not arise and thus either the iron nitride alloy or permalloy can be used.

The end portion 15a(1) corresponds to one specific example of "a first magnetic layer portion" of the invention. The wide portion 15a(2) corresponds to one specific example of "a third magnetic layer portion" of the invention. The top pole chip 15a corresponds to one specific example of "one magnetic pole" of the invention. The magnetic path connection portion 15b corresponds to one specific example of "a coupling magnetic layer" of the invention.

The top pole chip 15a and the magnetic path connection portion 15b are formed by use of the electroplating method called frame plating method, for instance, in the following manner. That is, the NiFe alloy, for example, is first formed with a thickness of about 70 nm by the sputtering, for example, whereby an electrode film (not shown) for functioning as a seed layer for the electroplating method is formed. Then, the above-mentioned electrode film is coated with a photoresist and the photoresist is patterned by the photolithography, whereby a photoresist pattern (not shown) is formed. Then, the top pole chip 15a and the magnetic path connection portion 15b are formed by electroplating process using the photoresist pattern as the mask and using the preformed electrode film as the seed layer. Then, the photoresist pattern used as the mask is removed.

Figure 8:
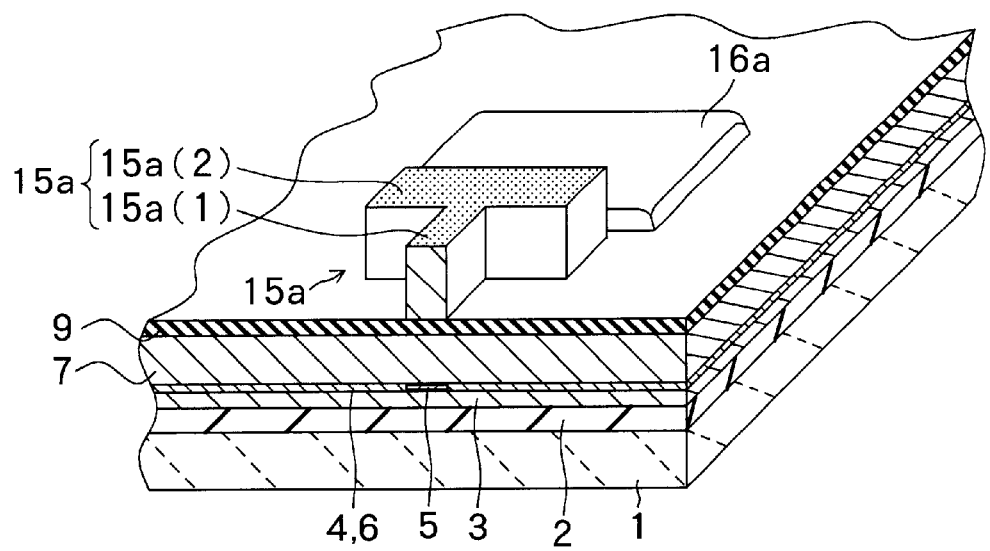
FIG. 8 is a perspective view for describing the process following the process of FIG. 7.

Then, as shown in FIGS. 2A and 2B and FIG. 8, an insulating film pattern 16a made of an organic photoresist, for example, is formed with a thickness of about 0.3 $\mu$m to 2.0 $\mu$m on the flat write gap layer 9 at the rear of the top pole chip 15a by the high-accuracy photolithography process. At the same time, an insulating film pattern 16b is also formed on the write gap layer 9 at the rear of the magnetic path connection portion 15b. Then, heat treatment takes place at a temperature of about 200° C. to 250° C., for example, in order to provide planarization of the insulating film patterns 16a and 16b. This heat treatment allows the insulating film pattern 16a to have a round and frontward-inclined surface near the edge thereof.

The insulating film pattern 16a may be formed so that the position of the front edge thereof may be shifted rearward slightly (e.g., by about 0.1 $\mu$m to 0.2 $\mu$m) from the position of a rear edge of the top pole chip 15a. Alternatively, the insulating film pattern 16a may be formed so that the position of the front edge thereof may match the position of the rear edge of the top pole chip 15a. As described below, the front edge of the insulating film pattern 16a is the position (TH0 position) at which a throat height is zero, which indicates a reference of the throat height. The rear edge of the first insulating film pattern 16a is positioned so as to reach to at least the region in which the thin film coils 21 are formed in the following process. Preferably, the width of the insulating film pattern 16a is larger than the width of the wide portion 15a(2) of the top pole chip 15a. The insulating film pattern 16a corresponds to one specific example of "a first insulating layer" or "a reference-defining insulating layer" of the invention. The front edge of the insulating film pattern 16a corresponds to one specific example of "a reference edge" of the invention.

Then, as shown in FIGS. 2A and 2B and FIG. 9, a top connection portion 20a is formed with a thickness of 2.0 $\mu$m to 3.0 $\mu$m, for example, so that a part of the top pole chip 15a and a front part of the insulating film pattern 16a may be coated with the top connection portion 20a. At this time, the top pole chip 15a, except a front part of the end portion 15a(1), is coated with the top connection portion 20a on three surfaces, i.e., the upper surface and both side surfaces of the top pole chip 15a. The top connection portion 20a has the plan shape shown in FIG. 9 and FIG. 12 discussed below, for example. The top connection portion 20a includes a front portion 20a(1) and a rear portion 20a(2). The top pole chip 15a is magnetically coupled to the top connection portion 20a through a contact portion between both of them. At the same time that the top connection portion 20a is formed, a magnetic path connection portion 20b is selectively formed on the magnetic path connection portion 15b. The top connection portion 20a corresponds to one specific example of "a second magnetic layer portion" or "a coupling magnetic layer" of the invention.

The top connection portion 20a and the magnetic path connection portion 20b are formed by the electroplating method, the sputtering method or the like using the material having the high saturation magnetic flux density, such as the permalloy alloy or the iron nitride alloy. When the material being prone to cause the crystalline anisotropy, such as the iron nitride alloy, is used as the material for forming the portions 20a and 20b, it is preferable that a formation is done not by the sputtering method but by the electroplating method. The reason is as follows. As described above, when the film of the iron nitride alloy is formed by the dry process such as the sputtering, the crystalline anisotropy occurs in a sputtered film formed on an underlying portion of the deposited top connection portion 20a (i.e., an inclined surface portion of the first insulating film pattern 16a), which has a different height from the height of the remaining portion. As a consequence, the magnetic flux transmittance is deteriorated, and thus a phenomenon of magnetic flux saturation or the like is prone to occur.

Then, as shown in FIG. 3A, a portion of the insulating film pattern 16a, i.e., the portion extending toward the rear of a rear edge surface of the top connection portion 20a is removed by etching or the like.

Then, as shown in FIGS. 3B and 10, the write gap layer 9 and the bottom pole 7 are etched by about 0.5 $\mu$m in self-alignment by means of dry etching or the like by, for example, ion milling method or RIE (Reactive Ion Etching) method using chlorine gas ($Cl_2$, $CF_4$, $BCl_2$, $SF_6$ or the like), whereby a trim structure is formed. This etching process is performed by using as the mask the photoresist film (not shown) selectively formed in the region at the rear of the rear edge of the top connection portion 20a and a top pole portion (the end portion 15a(1) and the top connection portion 20a) at the front of the rear edge of the top connection portion 20a.

Then, as shown in FIGS. 3A and 3B, the insulating film 17 made of an alumina film or the like, for example, is formed with a thickness of 0.5 $\mu$m to 1.5 $\mu$m over the whole surface.

Then, as shown in FIGS. 4A and 4B, the thin film coils 21 made of, for example, copper (Cu) for an inductive recording head are formed with a thickness of about 2 $\mu$m to 3 $\mu$m on the write gap layer 9 between the top connection portion 20a and the magnetic path connection portion 20b by the electroplating method, for example. At the same time that the thin film coils 21 are formed, a coil connection portion 21s is formed on the insulating film pattern 16b. The material of the coil connection portion 21s and the method of forming the coil connection portion 21s are the same as those of the thin film coils 21.

Then, the insulating film 22 made of alumina or the like, for example, is formed with a thickness of about 3 μm to 4 μm over the whole surface, whereby a rough region formed of the top connection portion 20a, the magnetic path connection portion 20b, the thin film coils 21, the coil connection portion 21s and so on is embedded in the insulating film 22. The above-mentioned insulating film 22 corresponds to one specific example of "a second insulating layer" or "a embedding insulating layer" of the invention.

Then, as shown in FIGS. 5A and 5B, the whole surface of the insulating film 22 is polished and flattened by CMP (Chemical Mechanical Polishing) method, for example. In this case, the surface of the insulating film 22 is polished until the respective surfaces of the top connection portion 20a and the magnetic path connection portion 20b are exposed. The coil connection portion 21s formed by the same process as the process for forming the thin film coils 21 is raised by the insulating film pattern 16b formed by the same process as the process for forming the insulating film pattern 16a. Thus, the above-mentioned CMP allows an exposure of the surface of the coil connection portion 21s substantially simultaneously with the surfaces of the top connection portion 20a and the magnetic path connection portion 20b.

Then, as shown in FIGS. 6A and 6B, a top pole 20c is selectively formed in the flattened region from the magnetic path connection portion 20b to the top connection portion 20a. At the same time, coil connection wiring 20h is formed in the region from the upper surface of the coil connection portion 21s to an external circuit (not shown). The coil connection wiring 20h provides electric connection between the coil connection portion 21s and the external circuit (not shown). The top pole 20c and the coil connection wiring 20h are formed with a thickness of, for example, about 2 μm to 3 μm by the electroplating method, the sputtering method or the like using the material having the high saturation magnetic flux density, such as the iron nitride alloy or the permalloy alloy. More particularly, in this process, the iron nitride alloy can be also used as in the case of the process for forming the top pole chip 15a because the underlying layer of the top pole 20c has the flat surface flattened by CMP. The reason is as follows. Even if the top pole 20c is deposited by the sputtering method, there is little possibility that the crystalline anisotropy occurs.

The top pole 20c has the plan shape shown in FIG. 12 discussed below, for instance. The top pole 20c includes a yoke portion 20c(1) extending on the region over the thin film coils 21, and a connection portion 20c(2) extending so as to overlap the top connection portion 20a at the front of the yoke portion 20c(1). Preferably, for example, the top pole 20c is formed so that the position of the front edge thereof may substantially match the position of the rear edge of the top ole chip 15a and so that the position of the rear edge thereof may substantially match the position of the rear edge of the magnetic path connection portion 20b. In the opening 9b, the top pole 20c is magnetically coupled to the bottom pole 7 through the magnetic path connection portions 15b and 20b and is magnetically coupled to the top pole chip 15a through the top connection portion 20-a. The top pole 20c corresponds to one specific example of "an additional magnetic layer portion" or "a yoke magnetic layer" of the invention.

Then, the overcoat layer 23 made of alumina, for example, is formed so that the whole surface may be coated with the overcoat layer 23. Finally, a slider or the like is worked by mechanical polishing, whereby an air bearing surface (track surface) 60 of the recording head and the reproducing head is formed. As a result, the thin film magnetic head according to this embodiment is completed.

[The Structure of a Principal Part of the Thin Film Magnetic Head According to the First Embodiment]

Next, the structure of a principal part of the thin film magnetic head according to this embodiment will be described with reference to FIGS. 6A and 6B and FIG. 12.

FIG. 12 shows a schematic representation of a plan structure of the thin film magnetic head manufactured by the manufacturing method of this embodiment. FIGS. 6A and 6B correspond to the cross section taken along line VIA—VIA of FIG. 12. The overcoat layer 23 and the like are not shown in FIG. 12. Only a part of a turn of the thin film coils 21 near the outer periphery thereof is shown in FIG. 12.

As described above, the position of the front edge of the insulating film pattern 16a is a reference position for determining a throat height TH, i.e., the position (TH0 position) at which the throat height is zero. The throat height TH is defined as the length between the TH0 position and the air bearing surface 60. The description "MRH" in FIG. 12 represents an MR height. The MR height is the length between the position of the rear edge of the MR film 5, i.e., the position (MRH0 position) at which the MR height is zero and the air bearing surface 60.

As shown in FIG. 12, the front portion of the top connection portion 20a is formed so that a part of the end portion 15a(1) of the top pole chip 15a and the wide portion 15a(2) thereof may be surrounded by the front portion on three sides, i.e., the upper surface and both side surfaces. The front portion of the top connection portion 20a is magnetically coupled to the top pole chip 15a. On the other hand, the region on the insulating film pattern 16a is filled with the rear portion of the top connection portion 20a. In this region, a sufficient magnetic volume is ensured. The magnetic volume means a maximum permissible amount of magnetic flux which can be contained in each portion. The rear portion of the top connection portion 20a is also in contact with the connection portion 20c(2) of the top pole 20c so as to overlap the connection portion 20c(2). The rear portion of the top connection portion 20a is magnetically coupled to the top pole 20c.

A front part (hereinafter referred to as a portion 15a(1)F) of the end portion 15a(1) of the top pole chip 15a is not coated with the top connection portion 20a but exposed. The portion 15a(1)F defines the recording track width on the recording medium during recording and has a uniform width with high accuracy. In FIG. 12, the respective centers of the top pole 20c, the top connection portion 20a and the top pole chip 15a along the widths thereof match one another.

The top pole 20c overlaps and is in contact with the magnetic path connection portion 20b in the rear region thereof, and the top pole 20c is magnetically coupled to the magnetic path connection portion 20b. After all, one magnetic path is formed of the top pole chip 15a, the top connection portion 20a, the top pole 20c, the magnetic path connection portion 20b, the magnetic path connection portion 15b and the bottom pole 7.

[A Function of the Thin Film Magnetic Head According to the First Embodiment]

Next, a function of the thin film magnetic head according to this embodiment will be described with reference to FIGS. 6A and 6B and FIGS. 11 and 12. In the following description, an x-axis direction, a y-axis direction and a z-axis direction in the drawings are indicated by "a width (or a width direction)", "a length" and "a thickness (or a thickness direction)", respectively.

In this thin film magnetic head, during an information-recording operation, a signal current is supplied from the external circuit (not shown) to the thin film coils 21 (not shown in FIG. 11) of a recording head section. The magnetic flux generated in response to this signal current propagates through the top pole 20c from the yoke portion 20c(1) to the connection portion 20c(2). Then, the magnetic flux flows into the portion 15a(1)F of the end portion 15a(1) via the rear portion 20a(2) and the front portion 20a(1) of the top connection portion 20a magnetically coupled to the connection portion 20c(2) and the wide portion 15a(2) of the top pole chip 15a. The magnetic flux flowing into the portion 15a(1)F further propagates to the endmost portion (the air bearing surface 60) of the portion 15a(1)F. The magnetic flux reaching to the endmost portion of the portion 15a(1)F generates a signal magnetic field outward. This signal magnetic field allows the recording of information on the recording medium (not shown).

On the other hand, during an information-reproducing operation, the signal magnetic field from the recording medium (not shown) is applied to the MR film 5 of a reproducing head section. In the MR film 5, a resistance value is changed in response to the applied signal magnetic field, and thus a sense current passing through the MR film 5 changes in magnitude. This sense current is converted into a signal voltage, for example, and the signal voltage is outputted to the external circuit (not shown). This allows the reading of the information from the recording medium.

As shown in FIG. 11, in this thin film magnetic head, in the process of propagation of the magnetic flux from the top pole 20c to the portion 15a(1)F, the width of each portion constituting a route of the propagation of the magnetic flux is narrowed in stages as it is closer to the portion 15a(1)F, whereby the magnetic volume is reduced in stages. Thus, the magnetic flux propagating from the top pole 20c to the portion 15a(1)F is focused in response to a step-by-step reduction in the magnetic volume along the width and the thickness of each portion constituting the route of the propagation.

As described above, according to the thin film magnetic head of this embodiment, the insulating film pattern 16a, aside from the insulating film 22 for embedding the thin film coils 21, is formed between the top pole chip 15a and the thin film coils 21. Moreover, the TH0 position is defined by the front edge of the insulating film pattern 16a. Thus, the throat height can be controlled only by changing the length of the insulating film pattern 16a, for example. Moreover, the insulating film pattern 16a has the round inclined surface near the front edge thereof, and therefore the magnetic flux can smoothly flow through the top connection portion 20a located on the insulating film pattern 16a.

Moreover, according to this embodiment, the region between the insulating film pattern 16a for defining the TH0 position and the front portion 20a(1) of the top pole 20c is filled with the top connection portion 20a. Thus, the sufficient magnetic volume can be ensured in this region. Furthermore, the magnetic layer portion (the wide portion 15a(2) and the top connection portion 20a with which the wide portion 15a(2) is covered) having the width and thickness larger than the width and thickness of the portion 15a(1)F of the top pole chip 15a is provided in the region immediately near the front of the TH0 position in a section of the throat height TH. Therefore, the sufficient magnetic volume can be ensured also in this portion. This prevents the saturation of the magnetic flux flowing from the top pole 20c into the top pole chip 15a in the portion 15a(1)F of the end portion 15a(1) having a minute width, thereby enabling the magnetic flux to sufficiently reach to the air bearing surface. Consequently, excellent overwrite properties can be ensured.

Moreover, in this embodiment, the wide portion 15a(2) of the top pole chip 15a is completely covered with the top connection portion 20a on four sides (the upper surface, both side surfaces and the rear surface). Moreover, a part of the end portion 15a(1) is also covered with and in contact with the top connection portion 20a on three sides (the upper surface and both side surfaces). Thus, an area of contact between the top pole chip 15a and the top connection portion 20a is increased. Accordingly, a loss of magnetic flux propagation on a boundary surface (contact surface) between the top pole chip 15a and the top connection portion 20a can be reduced. Thus, the magnetic flux can smoothly propagate from the top connection portion 20a to the top pole chip 15a.

Moreover, the magnetic layer portion (the wide portion 15a(2) and the top connection portion 20a with which the wide portion 15a(2) is covered) having the larger width and thickness is provided in the section of the throat height TH, whereby the saturation of the magnetic flux is avoided in this section. Thus, the length of the portion 15a(1)F of the end portion 15a(1) having a uniform width for defining the recording track width can be minimized, and the length of the throat height TH can be increased to a fixed length or more. As a result, it is possible to effectively prevent the magnetic flux from leaking out from the top pole 20c having an extremely high magnetic volume directly onto the air bearing surface. Therefore, a sidelight phenomenon on the recording medium can be prevented, and consequently the recording track width can be improved.

Moreover, the top pole chip 15a alone is formed on only the flat write gap layer 9 in the manufacturing process. Thus, this embodiment is little influenced by a reflected light from the underlying layer during the exposure for the photolithography process, compared to the related art in which the underlying layer is formed so as to extend to an inclined region. Thus, the photoresist pattern required to form the top pole chip 15a by the frame plating method, for instance, can be formed with higher accuracy. Consequently, not only the width of the end portion 15a(1) of the top pole chip 15a but also the width of the portion 15a(1)F can be fixed with high accuracy regardless of the positions of these portions. Thus, the recording track width on the recording medium can be narrowed, and variation in the recording track width can be reduced.

Moreover, the top pole chip 15a constituting a part of the top pole is formed on only the flat write gap layer 9. Therefore, the top pole chip 15a can be formed by the dry process using a magnetic material such as the iron nitride alloy which is difficult to apply for the reason of magnetic properties when the underlying layer has the inclined surface.

Moreover, in this embodiment, the top pole 20c and the coil connection wiring 20h can be formed on the flat surface formed by CMP. This facilitates making with high accuracy of the photoresist pattern for use in the formation of these magnetic layers in the photolithography process.

In this embodiment, the position of the front edge of the top pole 20c is substantially matched to the position of the rear edge of the top pole chip 15a or the TH0 position. However, the front edge of the top pole 20c may be positioned at the front of the TH0 position. Desirably, the front edge of the top pole 20c is positioned at the rear of the MRH0 position. The reason is as follows. If the front edge is positioned at the front of the MRH0 position, the connection portion 20c(2) having the high magnetic volume is too close to the air bearing surface 60. Thus, the sidelight phenomenon may occur due to a direct emission of the magnetic flux from the connection portion 20c(2) to the air bearing surface 60.

Moreover, the plan shapes of the top pole chip 15a, the top connection portion 20a and the top pole 20c of this embodiment are not limited to the above-described shapes. The plan shapes can be variously changed as long as they do not inhibit the above-mentioned properties of the propagation of the magnetic flux. Some modifications of this embodiment will be described below. In the drawings described in the following modifications, the same parts as components in the drawings discussed above are indicated by the same reference numerals and symbols, and the description is appropriately omitted.

[Modification 1-1]

Figure 13:
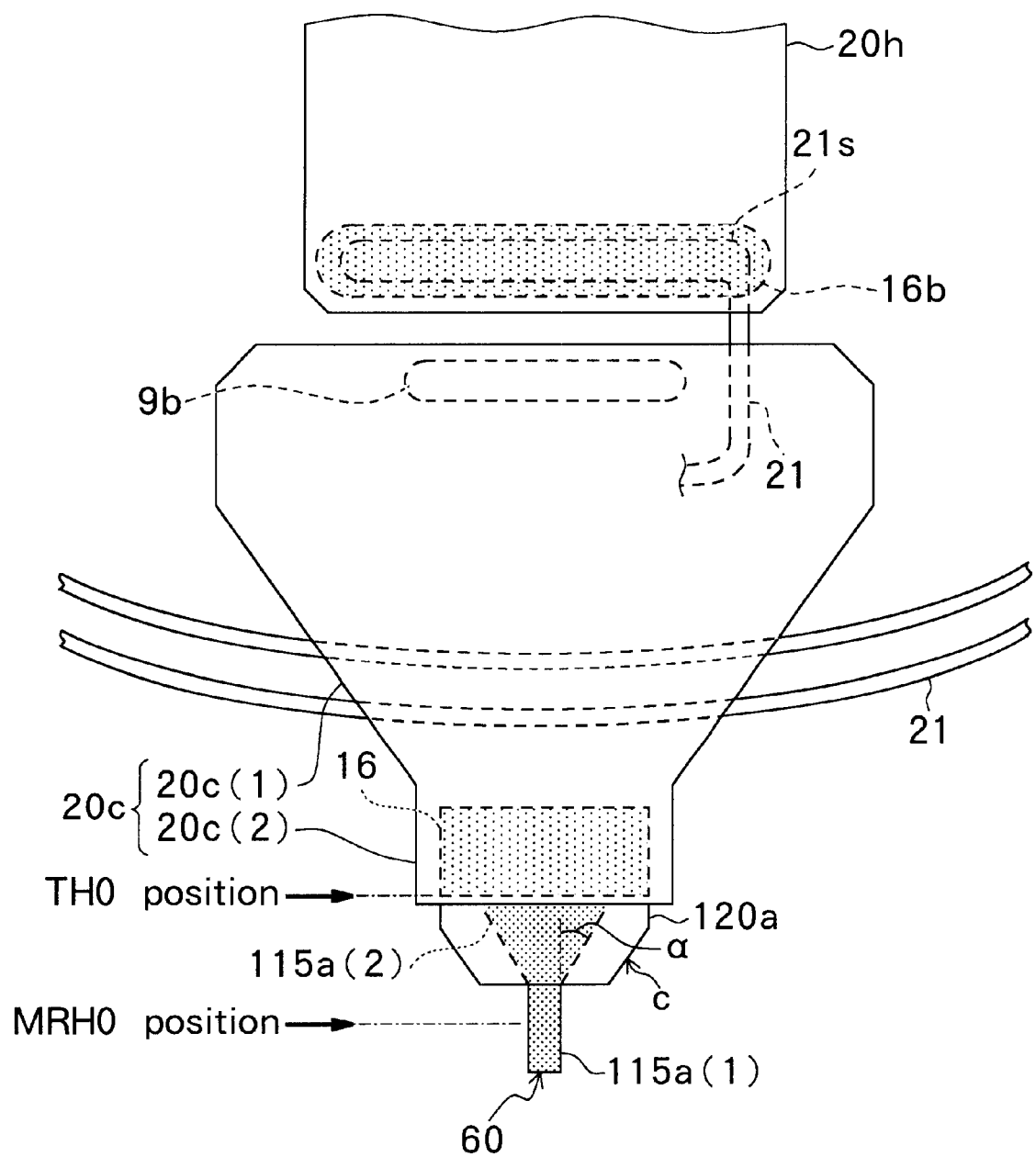
FIG. 13 is a plan view of the structure of the thin film magnetic head according to a modification of the first embodiment of the invention.

In the modification shown in FIG. 13, the width of a wide portion 115a(2) of a top pole chip 115a is gradually increased as it is farther from the air bearing surface 60. Moreover, in this modification, large chamfers C are provided at both front corners of a top connection portion 120a. Furthermore, an end portion 115a(1) is not coated with the top connection portion 120a. Only the tapered wide portion 115a(2) is covered with the top connection portion 120a on three sides. Preferably, an angle a which a side edge surface of the wide portion 115a(2) forms with the longitudinal direction thereof is 30 degrees to 60 degrees, for example. Other structural features are the same as those of FIG. 12. The end portion 115a(1) of the top pole chip 115a corresponds to one specific example of "the first magnetic layer portion" of the invention. The wide portion 115a(2) corresponds to one specific example of "the third magnetic layer portion" of the invention. The top connection portion 120a corresponds to one specific example of "the second magnetic layer portion" of the invention.

[Modification 1-2]

Figure 14A:
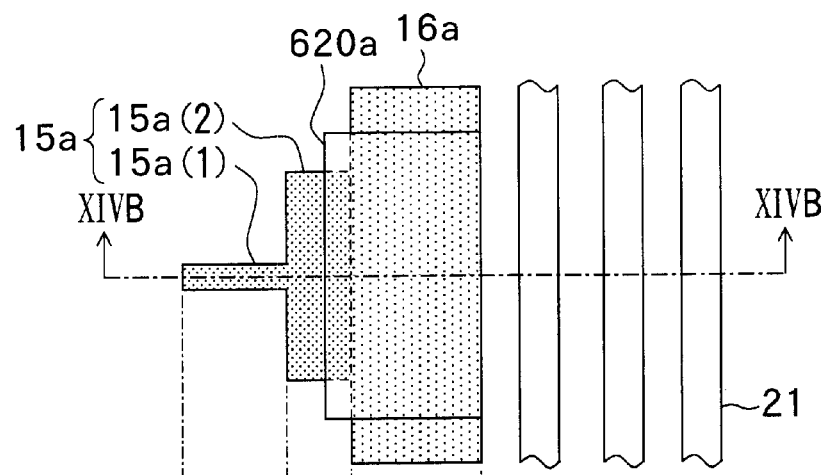
FIGS. 14A and 14B are a plan view and a cross sectional view of the method of manufacturing the thin film magnetic head according to another modification of the first embodiment of the invention, respectively.
Figure 14B:
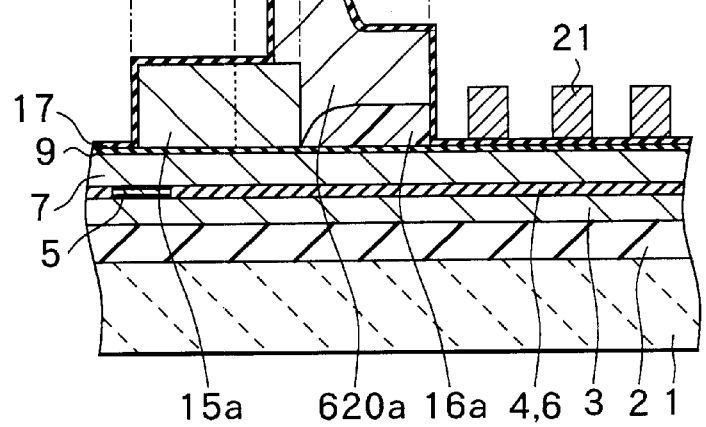
Figures 15A, 15B:
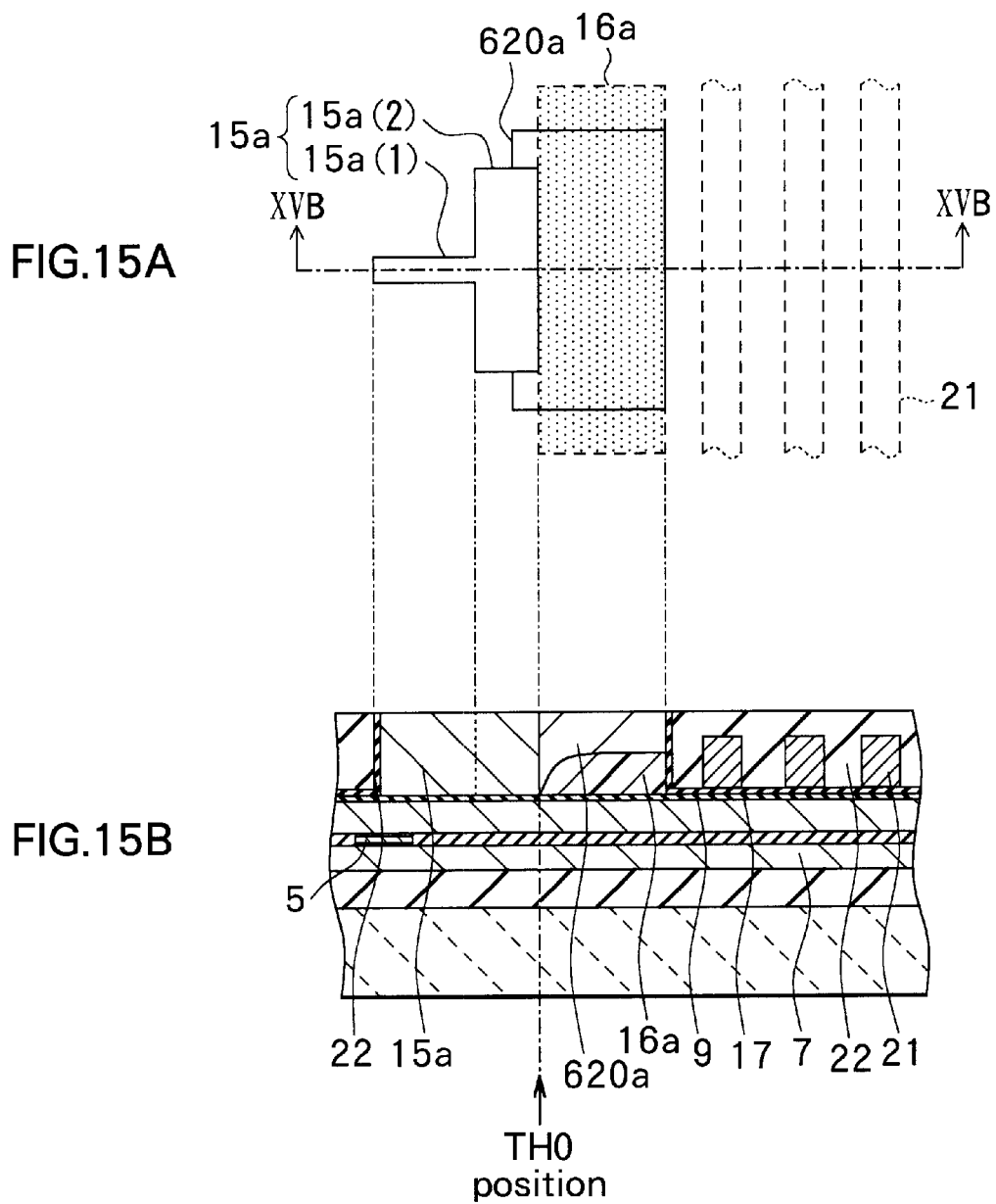
FIGS. 15A and 15B are a plan view and a cross sectional view for describing the process following the process of FIGS. 14A and 14B, respectively.

FIGS. 14A and 14B and FIGS. 15A and 15B illustrate another modification. FIGS. 14A and 14B and FIGS. 15A and 15B show a constitution of the principal part of the thin film magnetic head according to this modification in the main manufacturing process. FIGS. 14A and 15A are plan views. FIGS. 14B and 15B are cross sectional views taken along line XIVB—XIVB of FIGS. 14A and 15A.

In this modification, as shown in FIGS. 14A and 14B, the top pole chip 15a having the T-shaped plan shape as shown in FIG. 11 and the insulating film pattern 16a are formed on the write gap layer 9. Then, a top connection portion 620a having a rectangular plan shape is formed so that the wide portion 15a(2) of the top pole chip 15a and the insulating film pattern 16a may be partly coated with the top connection portion 620a. In this case, the top pole chip 15a may be in contact with the insulating film pattern 16a as shown in the drawings, or the top pole chip 15a may be slightly spaced away from the insulating film pattern 16a. Preferably, the width of the top connection portion 620a is greater than the width of the wide portion 15a(2) of the top pole chip 15a. The top connection portion 620a corresponds to one specific example of "the second magnetic layer portion" of the invention.

Then, the portion of the insulating film pattern 16a, i.e., the portion extending toward the rear of the rear end of the top connection portion 620a is removed by the etching or the like, for example. Then, after the insulating film 17 and the thin film coils 21 are formed, the insulating film 22 is formed over the whole surface and then the whole surface is polished and flattened by the CMP method or the like. Differently from FIGS. 5A and 5B, the polishing by the CMP method takes place until the surface of the top pole chip 15a and the surface of the top connection portion 620a are exposed as shown in FIGS. 15A and 15B. The top connection portion 620a is formed by such a process. As shown in FIG. 15A, the wide portion 15a(2) is covered with the top connection portion 620a so that the top connection portion 620a may be in contact with the partial side surfaces and the rear surface alone of the wide portion 15a(2) of the top pole chip 15a. The following processes are the same as those of the above-described embodiment. That is, the top pole 20c (not shown in FIGS. 15A and 15B) having the same plan shape as the shape shown in FIG. 11 is formed on the flattened surface, and then the process for forming the overcoat layer and so on are performed.

In this modification, polishing for planarization by CMP takes place until not only the top connection portion 620c but also the surface of the wide portion 15a(2) is exposed. Thus, the whole element structure can be slimmed down. Other effects are the same as those of the above-described first embodiment.

[Modification 1-3]

Figure 16:
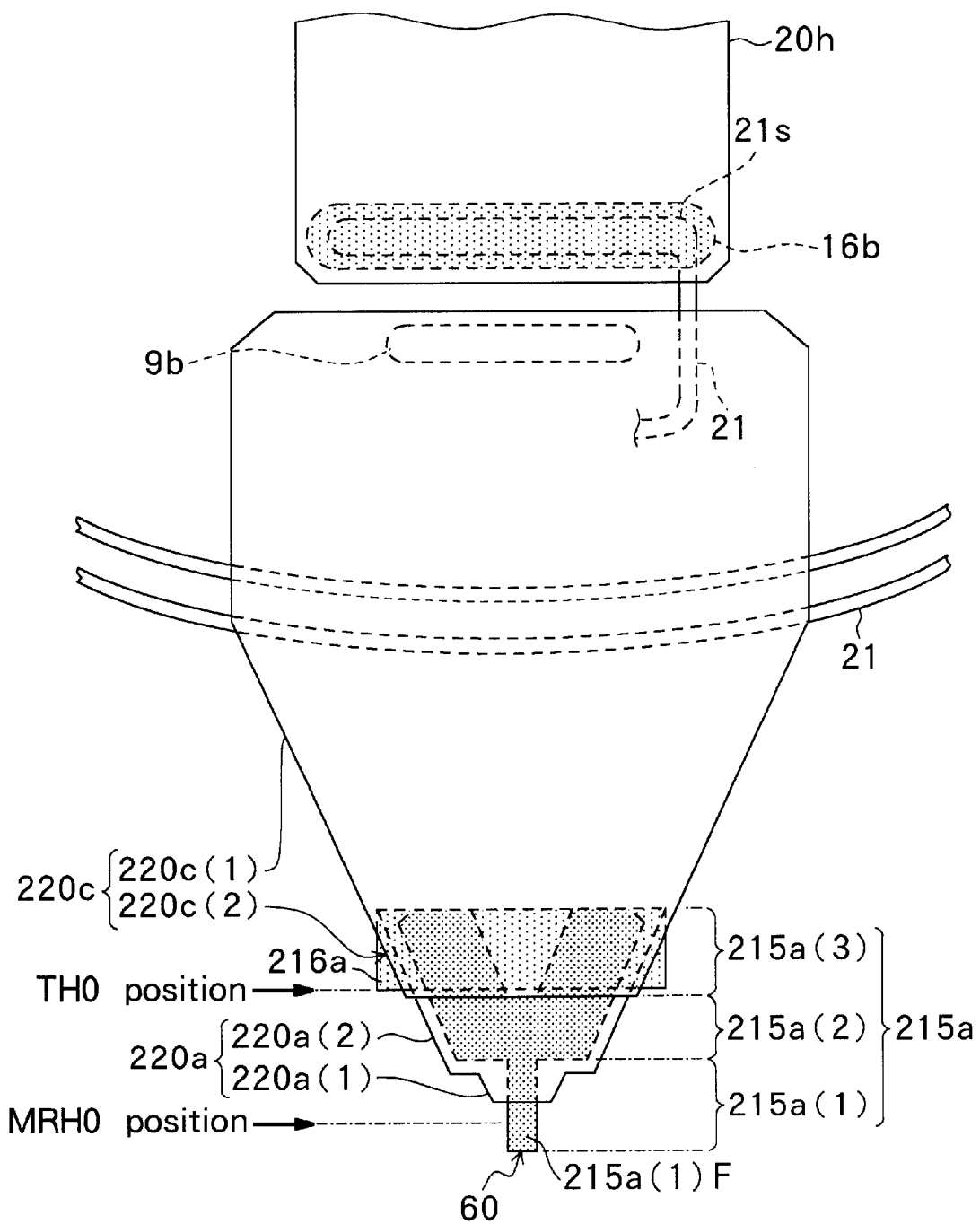
FIG. 16 is a plan view of the structure of the thin film magnetic head according to still another modification of the first embodiment of the invention.

FIG. 16 shows the plan structure of the principal part of the thin film magnetic head according to still another modification. In the thin film magnetic head shown in this drawing, a top pole chip 215a integrally includes an end portion 215a(1), a wide portion 215a(2) and two arm portions 215a(3). The arm portions 215a(3) are coupled to the rear end of the wide portion 215a(2). An insulating film pattern 216a has the rectangular plan shape. The arm portions 215a(3) of the top pole chip 215a extend from the TH0 position near the rear end of the wide portion 215a(2) onto the insulating film pattern 216a and terminate at the rear edge of the insulating film pattern 216a. The distance between the arm portions 215a(3) is gradually increased as it is farther from the air bearing surface 60. Two outer edge surfaces of the arm portions 215a(3) are in line with two outer edge surfaces of the wide portion 215a(2). The distance between these outer edge surfaces is gradually increased as it is farther from the air bearing surface 60. Both side edges of a connection portion 220c(2) and a yoke portion 220c(1) of the top pole are substantially parallel to the outer edge of the arm portions 215a(3).

The front edge of a top pole 220c terminates near the TH0 position. The plan shape of the top pole 220c near the front edge thereof and the plan shape of a rear portion 220a(2) of a top connection portion 220a substantially correspond to the plan shape of the top pole chip 215a. Moreover, the side edge surface of a front portion 220a(1) of the top connection portion 220a is substantially parallel to the side edge surface of the rear portion 220a(2). Preferably, the angle, which the outer edge surfaces along the widths of the wide portion 215a(2) and the arm portions 215a(3) of the top pole chip 215a and the side edge surface of the top connection portion 220a form with the surface perpendicular to the air bearing surface 60, is about 30 degrees to 70 degrees, for example.

The end portion 215a(1) of the top pole chip 215a corresponds to one specific example of "the first magnetic layer portion" of the invention. The wide portion 215a(2) corresponds to one specific example of "the third magnetic layer portion" of the invention. The arm portions 215a(3) correspond to one specific example of "a fourth magnetic layer portion" of the invention. The top pole 220c corresponds to one specific example of "the additional magnetic layer portion" of the invention. The insulating film pattern 216a corresponds to one specific example of "the second insulating layer" of the invention.

In this modification, a part (the arm portions 215a(3)) of the top pole chip 215a is located on the inclined surface of the insulating film pattern 216a. Thus, it is preferable that the top pole chip 215a is formed by the plating method when iron nitride is used, for example. When permalloy is used, the top pole chip 215a can be formed by the dry process such as the sputtering.

[Modification 1-4]

Figure 17:
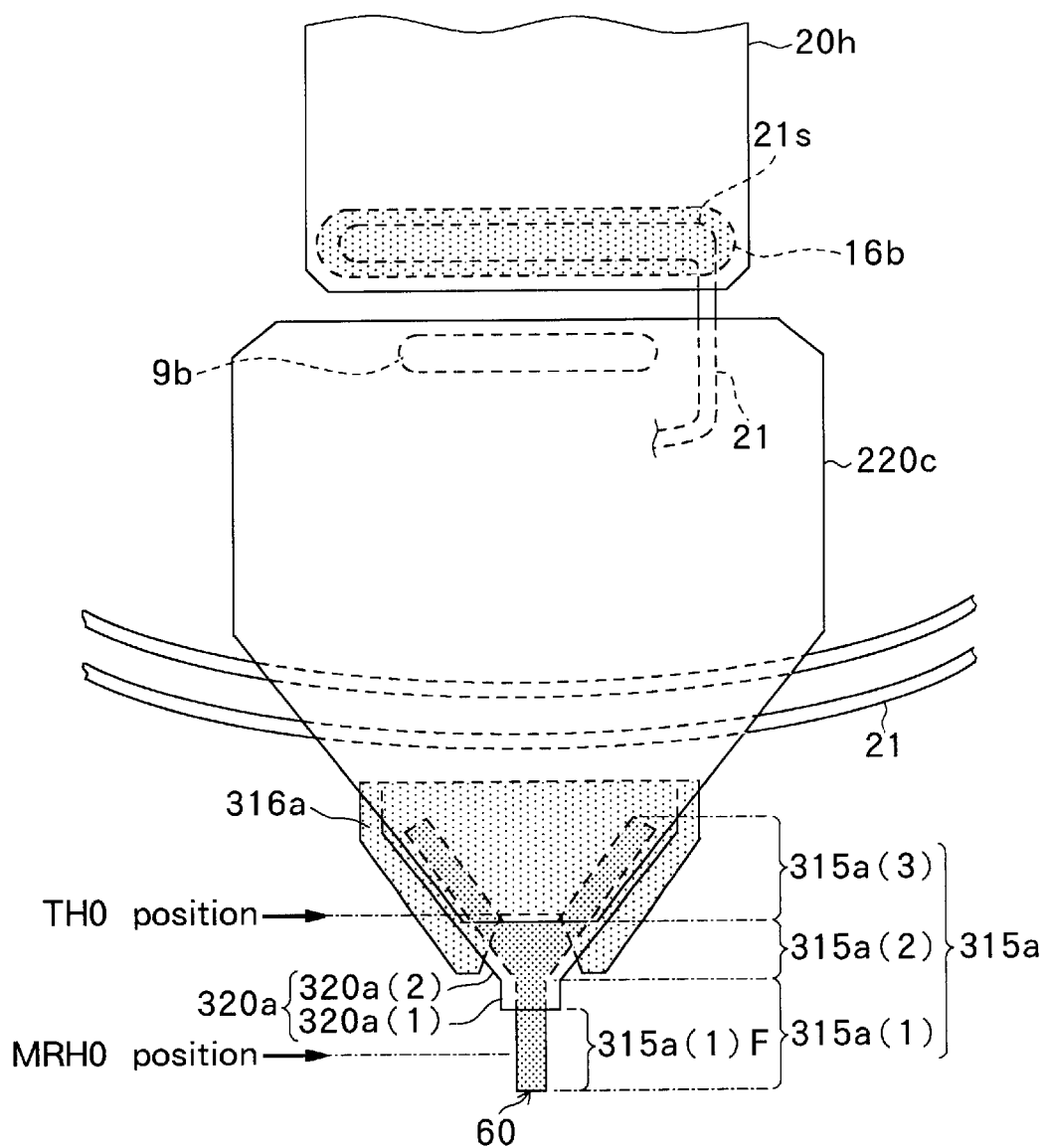
FIG. 17 is a plan view of the structure of the thin film magnetic head according to a further modification of the first embodiment of the invention.

FIG. 17 shows the plan structure of the principal part of the thin film magnetic head according to still another modification. In the thin film magnetic head shown in this drawing, a top pole chip 315a integrally includes an end portion 315a(1), a wide portion 315a(2) and two arm portions 315a(3). The arm portions 315a(3) are thinner than the arm portions 215a(3) in FIG. 16 discussed above. The arm portions 315a(3) are coupled to the rear end of the wide portion 315a(2). The arm portions 315a(3) extend from the rear end of the wide portion 315a(2) (near the TH0 position) onto an insulating film pattern 316a and terminate at the position that does not reach to the rear edge of the insulating film pattern 316a. The major portion of contours of the insulating film pattern 316a along the width thereof is along the arm portions 315a(3) of the Y-shaped top pole chip 315a. The insulating film pattern 316a extends to the front of the TH0 position and terminates near the rear end of the end portion 315a(1) (i.e., near the front end of the wide portion 315a(2)) except the region corresponding to the wide portion 315a(2) of the top pole chip 315a. Other shapes are substantially the same as those shown in FIG. 16.

The end portion 315a(1) of the top pole chip 315a corresponds to one specific example of "the first magnetic layer portion" of the invention. The wide portion 315a(2) corresponds to one specific example of "the third magnetic layer portion" of the invention. The arm portions 315a(3) correspond to one specific example of "the fourth magnetic layer portion" of the invention. A top connection portion 320a corresponds to one specific example of "the second magnetic layer portion" of the invention. The insulating film pattern 316a corresponds to one specific example of "the second insulating layer" of the invention.

In this modification, a part (the arm portions 315a(3)) of the top pole chip 315a is located on the inclined surface of the insulating film pattern 316a. Thus, it is preferable that the top pole chip 315a is formed by the plating method as in the case of the above-described modification 1-3 when the iron nitride alloy is used, for example. When permalloy is used, the top pole chip 315a can be formed by the dry process such as the sputtering.

[Modification 1-5]

Figure 18:
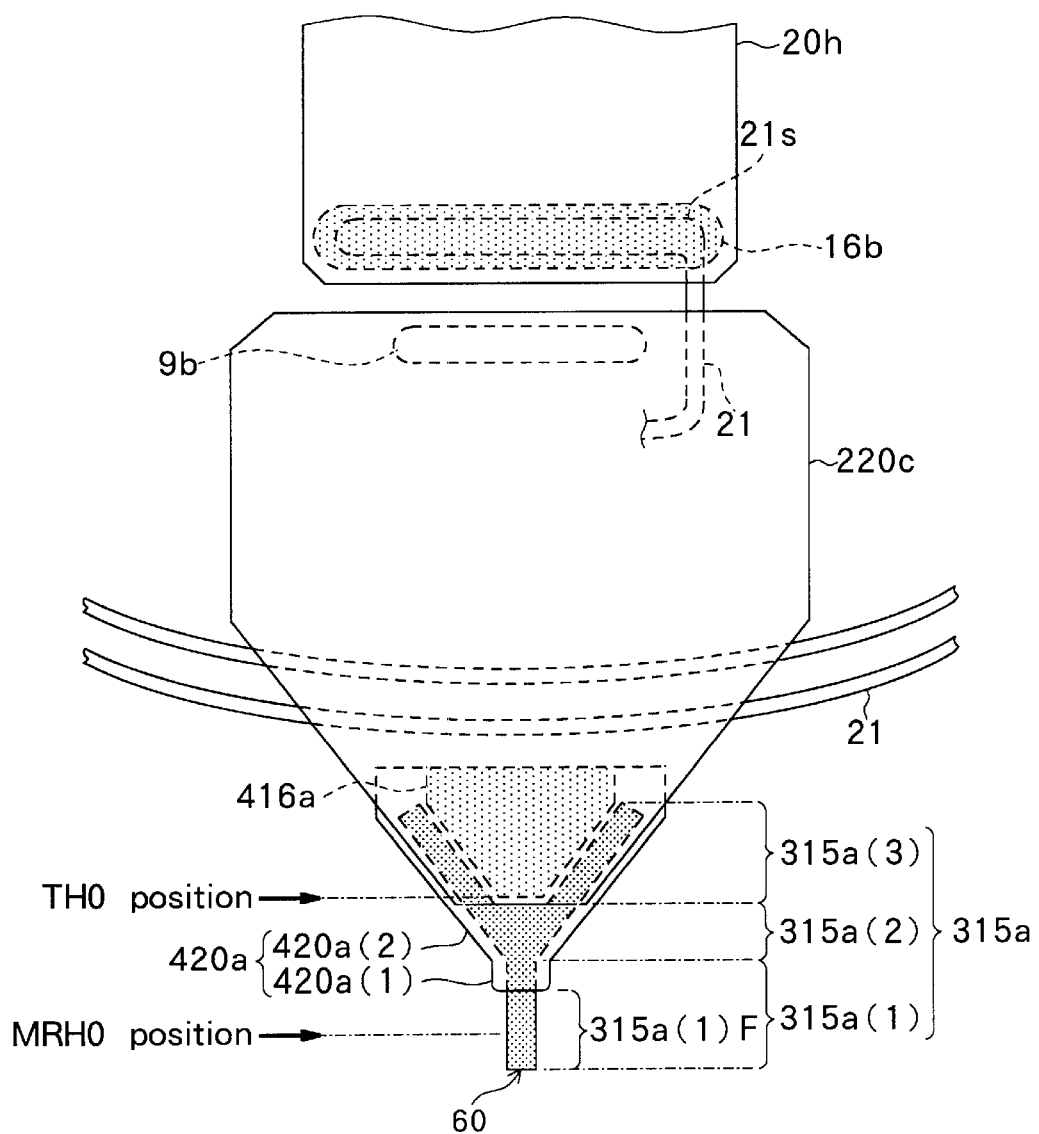
FIG. 18 is a plan view of the structure of the thin film magnetic head according to a further modification of the first embodiment of the invention.

FIG. 18 shows the plan structure of the principal part of the thin film magnetic head according to still another modification. The thin film magnetic head of this modification comprises the top pole chip 315a having the same shape as the shape of the top pole chip shown in FIG. 17. An insulating film pattern 416a extends into only the region (a Y-shaped valley region) sandwiched between the two arm portions 315a(3). Therefore, the arm portions 315a(3) are not mounted on the insulating film pattern 416a. A top connection portion 420a has substantially the same shape as that of the top connection portion 320a in FIG. 17 except that the corners of a front portion 420a(1) are roundly chamfered. Other shapes are substantially the same as those shown in FIG. 17. The top connection portion 420a corresponds to one specific example of "the second magnetic layer portion" of the invention. The insulating film pattern 416a corresponds to one specific example of "the second insulating layer" of the invention.

In this modification, the top pole chip 315a is not mounted on the insulating film pattern 416a and is entirely located on the write gap layer 9. For example, even when the iron nitride alloy is used, the top pole chip 315a can be therefore formed by the dry process such as the sputtering.

As described above, in each of the thin film magnetic heads shown in FIGS. 16 to 18, the top pole chip 215a (315a) has the Y-shaped plan shape so that not only the wide portion 215a(2) (315a(2)) but also the two arm portions 215a(3) (315a(3)) are covered with the top connection portion 220a (320a, 420a) on three sides. Thus, the area of contact between the top pole chip 215a (315a) and the top connection portion 220a (320a, 420a) can be further increased. Therefore, the loss of magnetic flux propagation on the boundary surface between the top pole chip 215a (315a) and the top connection portion 220a (320a, 420a) can be further reduced.

In the modifications shown in FIGS. 16 and 17, the top pole chips 215a and 315a extend onto the insulating film patterns 216a and 316a, respectively. To deposit these top pole chips by using, for example, the iron nitride alloy, it is thus preferable that the plating method, not the dry process such as the sputtering, is used in order to avoid the occurrence of the crystalline anisotropy in the film. On the other hand, in the modification shown in FIG. 18, the top pole chip 315a is not mounted on the insulating film pattern 416a and extends on only the flat write gap layer 9. Similarly to the first embodiment, the top pole chip 315a can be therefore formed by the process such as the sputtering even when the iron nitride alloy is used.

[Modification 1-6]

FIGS. 19A and 19B show the structure of the principal part of the thin film magnetic head according to still another modification in the main manufacturing process. FIG. 19A shows the plan structure of the principal part. FIG. 19B shows the cross section taken along line XIXB—XIXB of FIG. 19A.

In this modification, as shown in FIGS. 19A and 19B, a rectangular insulating film pattern 516a for defining the TH0 position is formed on the write gap layer 9. Then, the top pole chip 315a having the same shape as that shown in FIG. 17 is formed so that the arm portions 315a(3) thereof may be mounted on the insulating film pattern 516a. When the iron nitride alloy, for example, is used as the material for forming the top pole chip 315a, it is preferable that the top pole chip 315a is formed by the plating method, not the dry process such, as the sputtering.

Then, a top connection portion 520a having a substantially trapezoidal plan shape is formed so that the wide portion 315a(2) of the top pole chip 315a and the insulating film pattern 516a may be partly coated with the top connection portion 520a. In this case, the top pole chip 315a may be slightly spaced away from the insulating film pattern 516a as shown in the drawings, or the top pole chip 315a may be in contact with the insulating film pattern 516a. Preferably, the top connection portion 520a is formed so that the wide portion 315a(2) and the arm portions 315a(3) of the top pole chip 315a may be covered with the top connection portion 520a on three sides. In this modification, the front edge of the top connection portion 520a terminates at the rear end of the end portion 315a(1). However, a part of the end portion 315a(1) may be coated with the front edge of the top connection portion 520a. The top connection portion 520a corresponds to one specific example of "the second magnetic layer portion" of the invention. The insulating film pattern 516a corresponds to one specific example of "the second insulating layer" of the invention.

Then, after the insulating film 17 and the thin film coils 21 are formed, the insulating film 22 is formed over the whole surface and then the whole surface is polished and flattened by the CMP method or the like. The polishing by the CMP method takes place until the arm portions 315a(3) of the top pole chip 315a are exposed as shown in FIG. 19A. Such a process allows the formation of the following structure. That is, as shown in FIGS. 19A and 19B, the wide portion 315a(2) of the top pole chip 315a is covered with the top connection portion 520a on four sides, i.e., the upper surface, both side surfaces and the rear surface. Each of the two arm portions 315a(3) is covered with the top connection portion 520a on three sides, i.e., both side surfaces and the rear surface. The subsequent processes are the same as those of the above-described first embodiment.

In this modification, the top connection portion 520a is not located on the arm portions 315a(3) of the top pole chip 315a, but on the wide portion 315a(2). Thus, the thickness of the element structure can be relatively reduced, and the sufficient magnetic volume can be ensured along the width and the thickness in the region immediately near the end portion 315a(1). Of course, the sufficient magnetic volume is ensured along the width and the thickness also in the region on the insulating film pattern 516a.

Figure 20A:
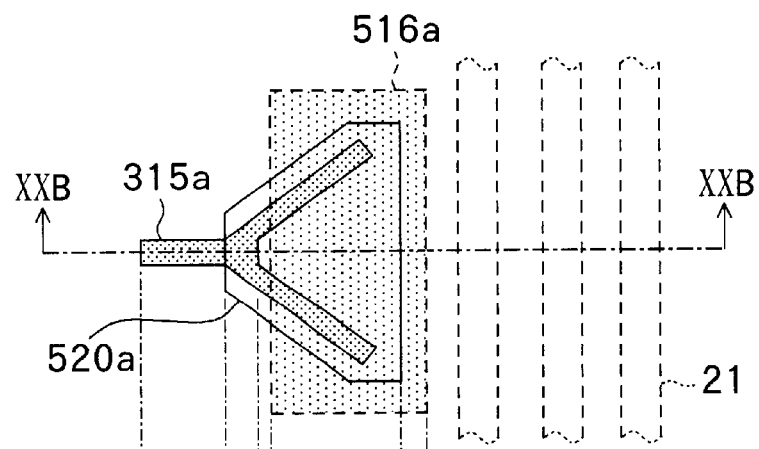
FIGS. 20A and 20B are a plan view and a cross sectional view for describing the process following the process of FIGS. 19A and 19B, respectively.
Figure 20B:
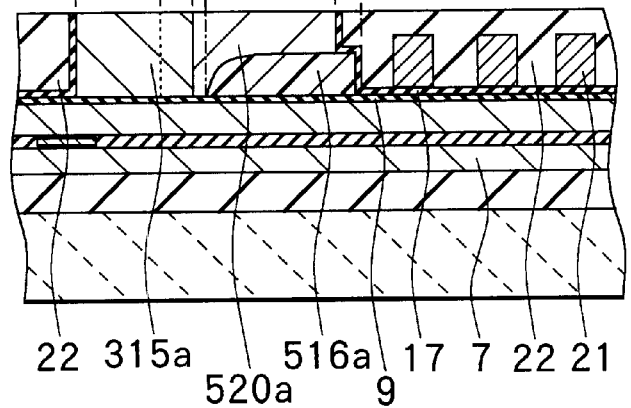

For example, as shown in FIGS. 20A and 20B, the polishing by the CMP method or the like may take place until the whole surface of the top pole chip 315a is exposed. In this case, the whole element structure can be further thinned, and the sufficient magnetic volume can be ensured along the width in the region immediately near the end portion 315a(1).

Second Embodiment

Next, the method of manufacturing the thin film magnetic head according to a second embodiment of the invention will be described with reference to FIGS. 21A and 21B and FIG. 22. Since the thin film magnetic head according to this embodiment is embodied by the method of manufacturing the thin film magnetic head according to this embodiment, the thin film magnetic head will be described in conjunction with the method of manufacturing the thin film magnetic head. In this embodiment, the thin film coils have a double-layer structure.

Figures 21A, 21B:
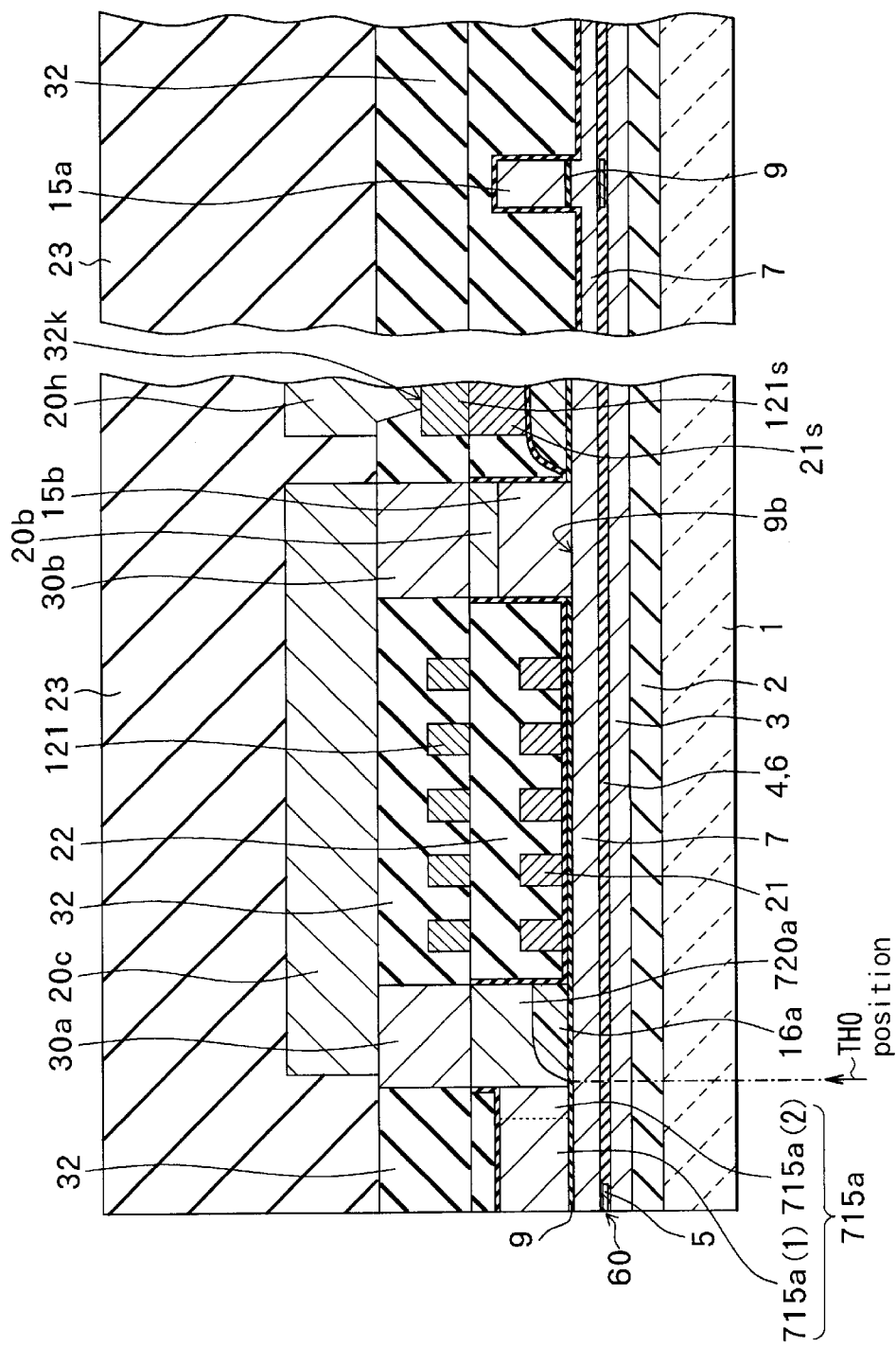
FIGS. 21A and 21B are cross sectional views of the structure of the thin film magnetic head according to a second embodiment of the invention.
Figure 22:
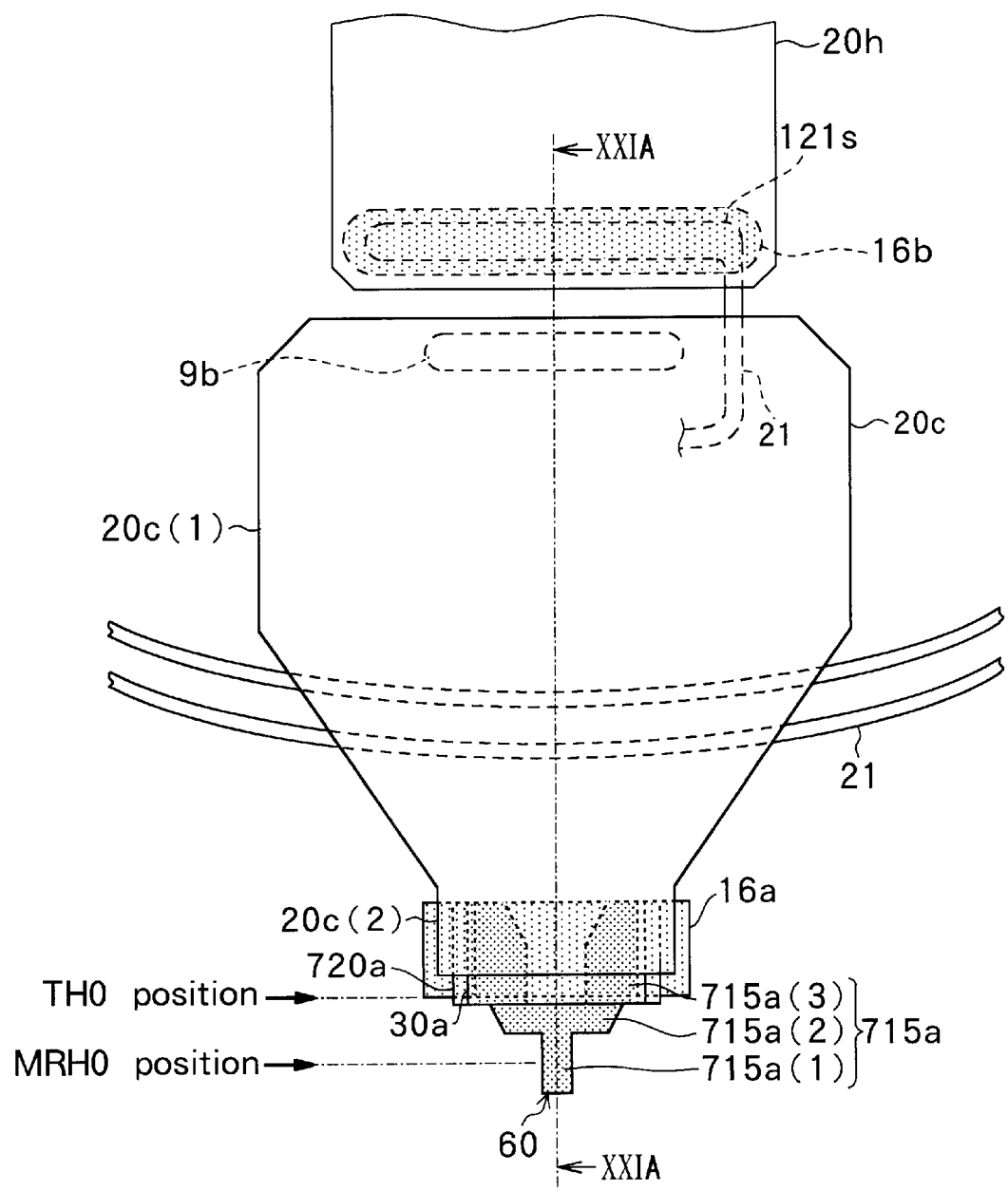
FIG. 22 is a plan view of the structure of the thin film magnetic head according to the second embodiment of the invention.

FIGS. 21A and 21B and FIG. 22 show the structure of the principal part of the thin film magnetic head according to this embodiment. FIG. 21A shows the cross section perpendicular to the air bearing surface. FIG. 21B shows the cross section of the magnetic pole portion parallel to the air bearing surface. FIG. 22 shows the plan structure of the principal part of the thin film magnetic head. In these drawings, the same parts as the components of the above-described first embodiment and so on are indicated by the same reference numerals and symbols.

In this embodiment, instead of the top pole chip 15a of the above-described first embodiment (FIG. 12), a top pole chip 715a having the plan shape shown in FIGS. 21A and 21B is formed. Instead of the top connection portion 20a, a top connection portion 720a having the plan shape shown in FIGS. 21A and 21B is formed. Except for these differences, in this embodiment, the process, in which the surface of the insulating film 22 is flattened by CMP until the surfaces of the top connection portion 20a and the magnetic path connection portion 20b are exposed, and the preceding processes are substantially the same as those of the above-described first embodiment. Thus, the description is omitted. The top pole chip 715a corresponds to one specific example of "the first magnetic layer portion" of the invention. The top connection portion 720a corresponds to one specific example of "the second magnetic layer portion" of the invention.

In this embodiment, as shown in FIGS. 21A and 21B, the surfaces of the insulating film 22 and so on are flattened, and then another top connection portion 30a having the rectangular plan shape, for example, is selectively formed with a thickness of 2 $\mu$m to 3 $\mu$m on the top connection portion 720a. At the same time, another magnetic path connection portion 30b is formed on the magnetic path connection portion 20b. The top connection portion 30a is positioned so that the position of the front edge thereof may match the position of the rear edge of the top pole chip 715a, for instance. The materials of the top connection portion 30a and the magnetic path connection portion 30b and the method of forming these portions 30a and 30b are the same as those of the top connection portion 720a and a magnetic path connection portion 20b.

Then, second-layer thin film coils 121 are formed with a thickness of, for example, about 1.5 $\mu$m to 2.5 $\mu$m on the insulating film 22 in the region between the top connection portion 30a and the magnetic path connection portion 30b by the electroplating method, for instance. Simultaneously, a coil connection portion 121s constituting an inner termination of the thin film coils 121 is formed on the coil connection portion 21s in the region at the rear of the magnetic path connection portion 30b. The coil connection portion 121s connects the first-layer thin film coils 21 to the second-layer thin film coils 121.

Then, an insulating film 32 made of the alumina film, for example, is formed with a thickness of, for example, about 3 $\mu$m to 4 $\mu$m over the whole surface. Then, the whole surface is polished and flattened by the CMP method or the like. The surface polishing by the CMP method takes place until the surfaces of the top connection portion 30a and the magnetic path connection portion 30b are exposed. In this case, the upper surface of the coil connection portion 121s is positioned at the same height as the that of the upper surface of the thin film coils 121. The upper surface of the coil connection portion 121s is embedded in the insulating film 32.

Then, an opening 32k is formed in the insulating film 32 on the coil connection portion 121s, whereby the upper surface of the coil connection portion 121s is partly exposed. Then, the top pole 20c is selectively formed in the region from the magnetic path connection portion 30b to the top connection portion 30a. At the same time, the coil connection wiring 20h is formed in the region from the exposed upper surface of the coil connection portion 121s to the external circuit (not shown). The coil connection wiring 20h provides electric connection between the coil connection portion 121s and the external circuit. Since the following processes are the same as those of the above-mentioned first embodiment (FIG. 16), the description is omitted.

Next, the structural features of the thin film magnetic head of this embodiment will be described with reference to FIG. 22 in comparison with FIGS. 12 and 16 showing the above-mentioned first embodiment and the modification thereof. In this embodiment, as shown in FIG. 22, the plan shape of the top pole chip 715a is changed from the T-shape of FIG. 12 or the Y-shape of FIG. 16 to a combination of an I-shape and a U-shape. An end portion 715a(1) has the I-shape. A wide portion 715a(2) and arm portions 715a(3) are integrally substantially U-shaped. The arm portions 715a(3) extend onto the insulating film pattern 16a. Differently from FIG. 16, the two arm portions 715a(3) extend substantially parallel to each other. The arm portions 715a (3) terminate at the rear edge of the insulating film pattern 16a. The inner facing corners of the rear corners of the two arm portions 715a(3) are chamfered. The wide portion 715a(2) has the plan shape whose width is narrowed as it is closer to the air bearing surface. When the iron nitride alloy, for example, is used as the material for forming the top pole chip 715a, it is preferable that the top pole chip 715a is formed not by the dry process such as the sputtering but by the plating method for the same reason as in the case of the modification 1-3 of the above-described first embodiment.

The position of the front edge of the top connection portion 720a substantially matches the position of the rear edge of the wide portion 715a(2). The position of the rear edge of the top connection portion 720a terminates at the rear edge of the insulating film pattern 16a. Accordingly, only the arm portions 715a(3) of the top pole chip 715a are covered with the top connection portion 720a on three sides, i.e., the upper surface and both the side surfaces.

The top connection portion 30a is located so as to overlap the top pole chip 715a and the top pole 20c. The top connection portion 30a provides connection between the top pole chip 715a and the top pole 20c. The top connection portion 30a has the rectangular plan shape. The front and rear edges of the top connection portion 30a substantially match those of the top connection portion 720a. Although the width of the top connection portion 30a is smaller than the width of the top pole 20c in FIG. 22, the width of the top connection portion 30a may be equal to or greater than the width of the top pole 20c.

The front edge of the top pole 20c is positioned slightly rearward with respect to the position of the front edge of the top connection portion 30a. However, the position of the front edge of the top pole 20c may be matched to the position of the front edge of the top connection portion 30a. Alternatively, the front edge of the top pole 20c may be positioned frontward with respect to the position of the front edge of the top connection portion 30a. The position of the rear edge of the top connection portion 30a substantially matches the position of the rear edge of the magnetic path connection portion 30b. The top pole 20c is magnetically coupled to the bottom pole 7 through the magnetic path connection portions 30b, 20b and 15b. The top pole 20c is magnetically coupled to the top pole chip 15a through the top connection portions 30a and 20a. These magnetic layers constitute the magnetic path by which the thin film coils 21 and 121 are surrounded. Other structures are the same as the structure of FIG. 12.

The thin film magnetic head having the above-described structure delivers high performance in the overwrite properties as in the case of the above-mentioned first embodiment. More particularly, in this embodiment, the double-layer thin film coils 21 and 121 are provided as described above. Thus, an amount of generation of the magnetic flux in a thin film coil section can be increased.

Moreover, in this embodiment, the thin film coils have the double-layer structure, and consequently a space is provided between the top connection portion 20a and the top pole 20c. In this embodiment, as shown in FIGS. 21A and 21B, the magnetic volume is further ensured along the thickness in the region at the rear of the top connection portion 720a by taking advantage of this space. This magnetic volume is ensured by the top connection portions 20a and 30a. A large amount of magnetic flux generated by the double-layer thin film coils 21 and 121 is contained in the top connection portions 20a and 30a. Thus, the occurrence of magnetic saturation can be avoided in the region at the rear of the wide portion 715a(2) of the top pole chip 715a. Therefore, a sufficient amount of magnetic flux is supplied to the end portion 715a(1) through the arm portions 715a(3) and the wide portion 715a(2). As a result, the excellent overwrite properties can be ensured.

Moreover, in this embodiment, all of the top pole chip 715a, the top connection portion 30a and the top pole 20c can be formed on the flat portion. Thus, the photoresist pattern can be formed with high accuracy by the photolithography, and therefore manufacturing accuracy can be improved. More particularly, the width of the end portion 715a(1) can be made minute with high accuracy.

Other functions and effects are the same as those of the above-described first embodiment.

In this embodiment, the position of the rear edge of the top connection portion 30a does not have to necessarily match the position of the rear edge of the top pole chip 715a. The position of the rear edge of the top connection portion 30a may be shifted frontward or rearward from the position of the rear edge of the top pole chip 715a.

Third Embodiment

Next, a third embodiment of the invention will be described with reference to FIGS. 23A to 27B. FIGS. 23A, 24A, 25A, 26A and 27A show the cross section perpendicular to the air bearing surface. FIGS. 23B, 24B, 25B, 26B and 27B show the cross section of the magnetic pole portion parallel to the air bearing surface. In these drawings, the same parts as the components of the above-described embodiments are indicated by the same reference numerals and symbols. In this embodiment, the double-layer thin film coils are formed with the write gap layer 9 sandwiched between the first-layer and second-layer thin film coils.

Figures 23A, 23B:
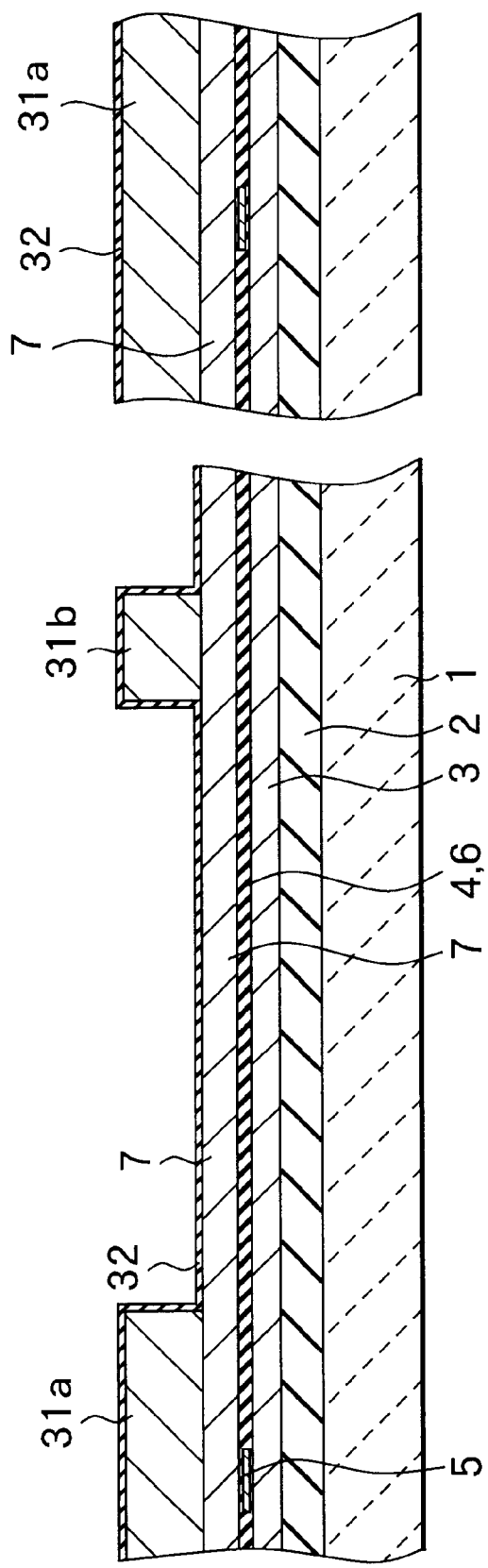
FIGS. 23A and 23B are cross sectional views for describing one process of the method of manufacturing the thin film magnetic head according to a third embodiment of the invention.

In this embodiment, the process for forming the bottom pole 7 shown in FIGS. 23A and 23B is the same as that in FIGS. 1A and 1B in the above-described first embodiment. Thus, the description is omitted.

In this embodiment, as shown in FIGS. 23A and 23B, after the bottom pole 7 is formed, a bottom pole chip 31a and a bottom connection portion 31b made of permalloy, for example, are formed by, for example, the plating method with a thickness of about 2.0 $\mu$m to 2.5 $\mu$m on the bottom pole 7 at the front and rear of the region in which thin film coils 33 are formed in the following process. Then, the insulating film 32 of about 0.3 $\mu$m to 0.6 $\mu$m thick made of an insulating material such as alumina is formed over the whole surface by the sputtering method or CVD (Chemical Vapor Deposition) method, for instance.

Then, as shown in FIGS. 24A and 24B, the first-layer thin film coils 33 are formed with a thickness of about 1.5 $\mu$m to 2.5 $\mu$m in a low region except the bottom pole chip 31a and the bottom connection portion 31b by, for instance, the electroplating method in such a manner that the bottom connection portion 31b is surrounded by the thin film coils 33. At the same time, a coil connection portion 33s is selectively formed in the low region at the rear of the bottom connection portion 31b. Then, as shown in these drawings, an insulating film 34 such as the alumina film is formed with a thickness of about 3 $\mu$m to 4 $\mu$m over the whole surface. Then, the whole surface is polished and flattened by the CMP method, for example, whereby the surfaces of the bottom pole chip 31a and the bottom connection portion 31b are exposed.

Then, as shown in FIGS. 25A and 25B, the write gap layer 9 made of alumina, for example, is formed with a thickness of about 0.15 $\mu$m to 0.3 $\mu$m over the whole surface. The opening 9b is formed in the write gap layer 9 on the bottom connection portion 31b. Then, as shown in these drawings, the top pole chip 315a for constituting a part of the top pole is formed with a thickness of about 2 μm to 3 μm on the flat write gap layer 9 in the region at the front of the region in which the thin film coils 33 are formed. The top pole chip 315a has the same Y-shaped plan shape as that shown in FIG. 18, for example. At the same time that the top pole chip 315a is formed, the magnetic path connection portion 15b is formed in the opening 9b. The connecting method for the top pole chip 315a and the magnetic path connection portion 15b, the materials thereof and the like are the same as those of the above-mentioned first embodiment, for example. Then, the insulating film pattern 416a having the same plan shape as that of FIG. 18 is formed between the two arm portions 315a(3) of the top pole chip 315a in the region on the flat write gap layer 9. Then, the heat treatment takes place, whereby the insulating film pattern 416a has the round and frontward-inclined surface near the edge thereof. A film thickness of the insulating film pattern 416a, the method of forming the insulating film pattern 416a and so on are the same as those of the above-mentioned first embodiment (FIG. 18).

Then, as shown in FIGS. 25A and 25B, the top connection portion 420a is formed so that a part of the top pole chip 315a and the front portion of the insulating film pattern 416a may be coated with the top connection portion 420a. The magnetic path connection portion 20b is selectively formed on the magnetic path connection portion 15b. The shapes, structures and materials of the top connection portion 420a and the magnetic path connection portion 20b, the method of forming these portions 420a and 20b and so on are the same as those of the above-mentioned first embodiment (FIG. 18). Then, the portion of the insulating film pattern 416a, i.e., the portion extending toward the rear of the rear edge surface of the top connection portion 420a is removed by the etching or the like. Then, the write gap layer 9 and the bottom pole 7 are etched in self-alignment by the dry etching process similarly to the above-mentioned first embodiment, for example, whereby the trim structure is formed. Then, the insulating film 17 made of the alumina film or the like, for example, is formed with a thickness of 0.5 μm to 1.5 μm over the whole surface.

Figures 26A, 26B:
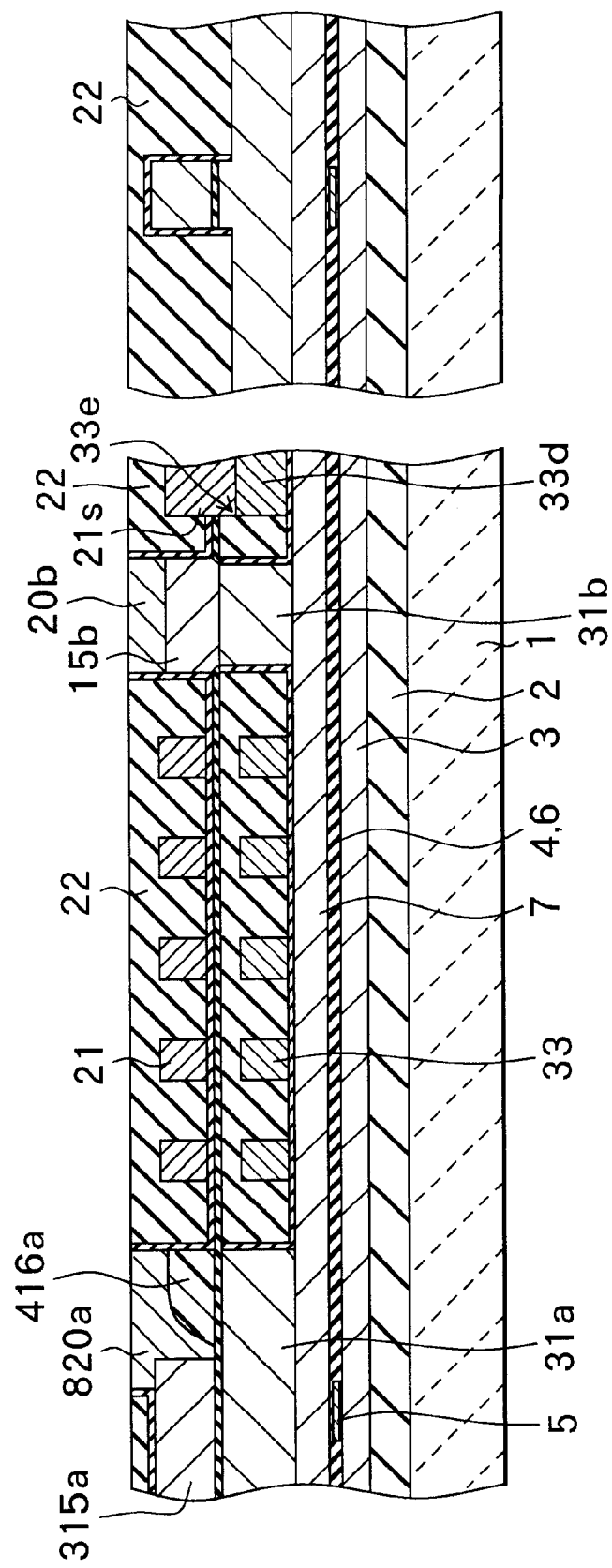
FIGS. 26A and 26B are cross sectional views for describing the process following the process of FIGS. 25A and 25B.

Then, as shown in FIGS. 26A and 26B, the insulating film 34 with which the coil connection portion 33s is coated, the write gap layer 9 and the insulating film 17 are selectively etched, whereby an opening 33e is formed. Then, the second-layer thin film coils 21 are formed on the write gap layer 9 between the top connection portion 420a and the magnetic path connection portion 20b by the same forming method as the method of forming the thin film coils 33. Simultaneously, the coil connection portion 21s constituting an inner peripheral end of the thin film coils 21 is formed in the opening 33e on the coil connection portion 33s, whereby the coil connection portion 33s is electrically connected to the coil connection portion 21s. The materials of the thin film coils 21 and the coil connection portion 21s and the method of forming them are the same as those of the thin film coils 33.

Then, the insulating film 22 made of alumina or the like, for example, is formed with a thickness of, for example, about 3 μm to 4 μm over the whole surface, whereby the rough region formed of the top connection portion 420a, the magnetic path connection portion 20b, the thin film coils 21, the coil connection portion 21s and so on is embedded in the insulating film 22. The insulating film 22 corresponds to one specific example of "the second insulating layer" of the invention. Then, the whole surface of the insulating film 22 is polished and flattened by the CMP (Chemical Mechanical Polishing) method, for example. In this case, the polishing takes place until the respective surfaces of the top connection portion 420a and the magnetic path connection portion 20b are exposed.

Then, as shown in FIGS. 27A and 27B, the region of the flattened insulating film 22, i.e., the region with which the coil connection portion 21s is coated is selectively etched, whereby an opening 22a is formed and thus the surface of the coil connection portion 21s is partly exposed. Then, the top pole 20c is selectively formed in the region from the magnetic path connection portion 20b to the top connection portion 420a. The coil connection wiring 20h is formed in the region from the upper surface of the coil connection portion 21s to the external circuit (not shown). The plan shapes and materials of the top pole 20c and the coil connection wiring 20h and the method of forming them are the same as those of the above-mentioned first embodiment (FIG. 12), for instance. Then, the overcoat layer 23 made of alumina, for example, is formed so that the whole surface may be coated with the overcoat layer 23. Finally, the slider or the like is worked by the mechanical polishing, whereby the air bearing surface 60 of the recording head and the reproducing head is formed. As a result, the thin film magnetic head according to this embodiment is completed.

According to this embodiment, the first-layer coils (the thin film coils 33) of the double-layer thin film coils are formed close to the bottom pole 7, not the write gap layer 9. Thus, the second-layer coils (the thin film coils 21) on the write gap layer 9 forming the boundary between the first-layer and second-layer coils can have substantially the same structure as the first-layer thin film coils have. Other functions and effects are the same as those of the above-described second embodiment.

Fourth Embodiment

Next, a fourth embodiment of the invention will be described with reference to FIGS. 29A to 31.

Figure 31:
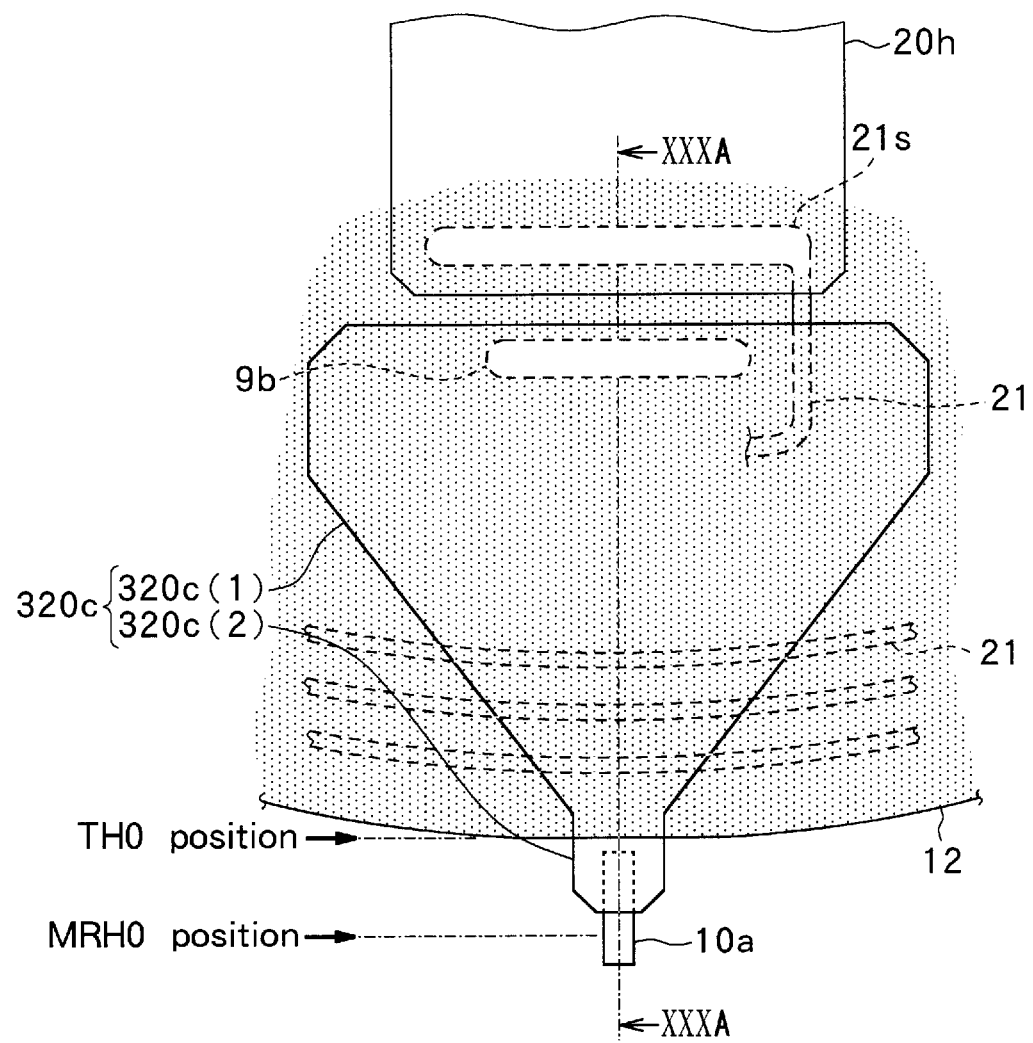
FIG. 31 is a plan view of the structure of the thin film magnetic head according to the fourth embodiment of the invention.
Figure 32:
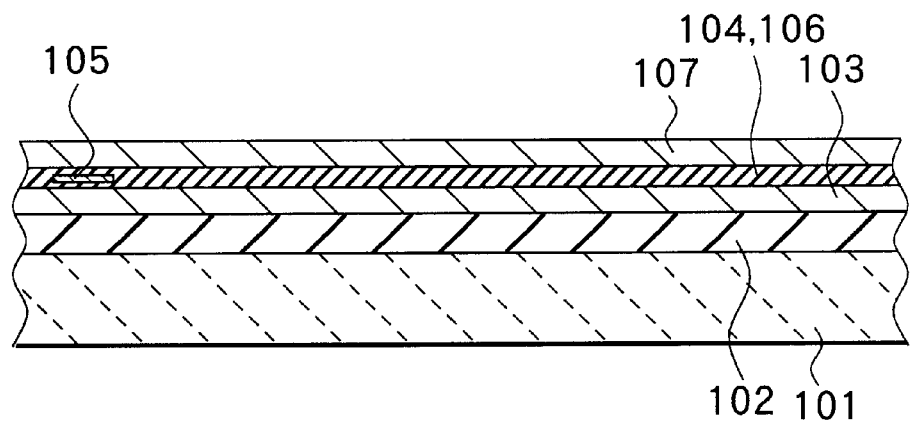
FIG. 32 is a cross sectional view for describing one process of the method of manufacturing the thin film magnetic head of the related art.
Figure 33:
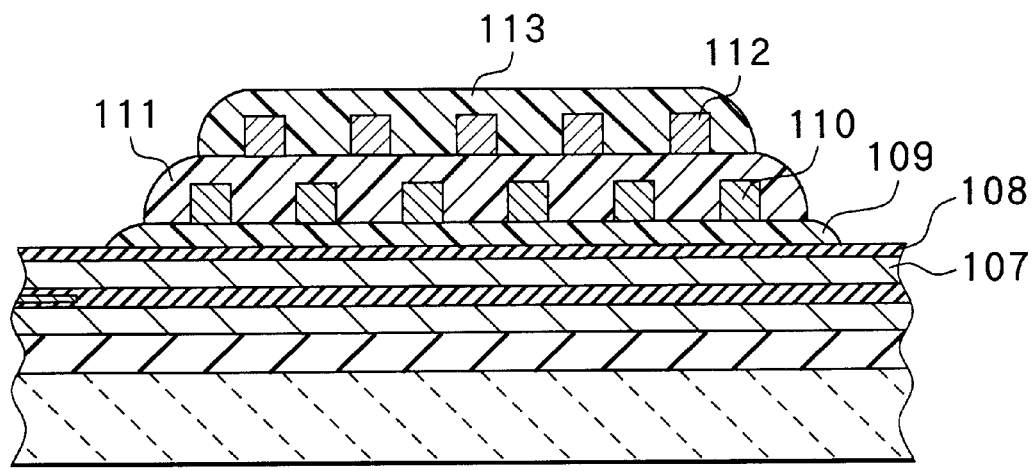
FIG. 33 is a cross sectional view for describing the process following the process of FIG. 32.
Figure 34:
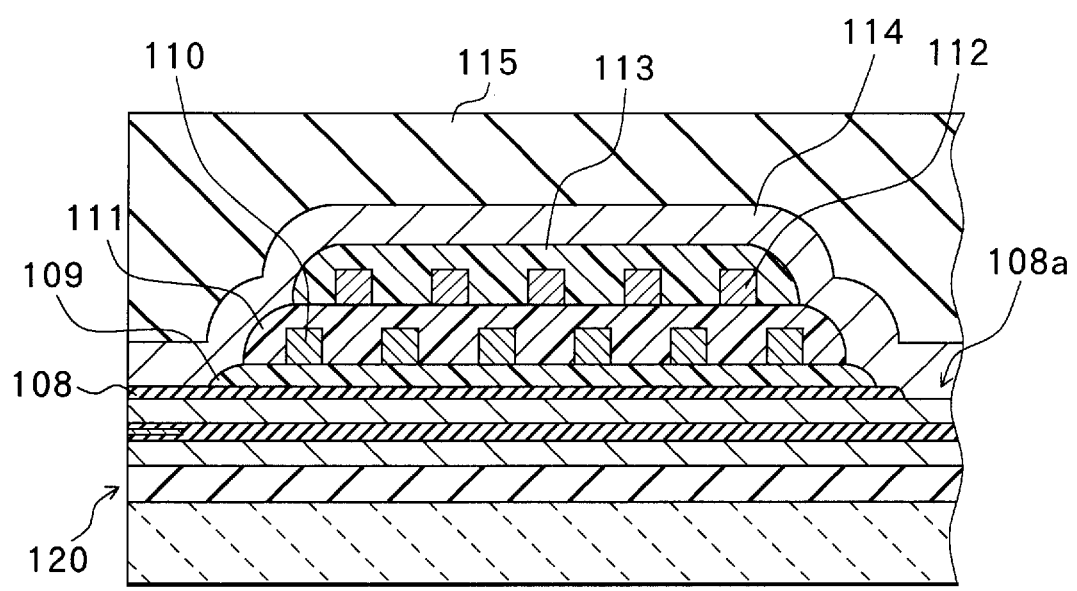
FIG. 34 is a cross sectional view for describing the process following the process of FIG. 33.
Figure 35:
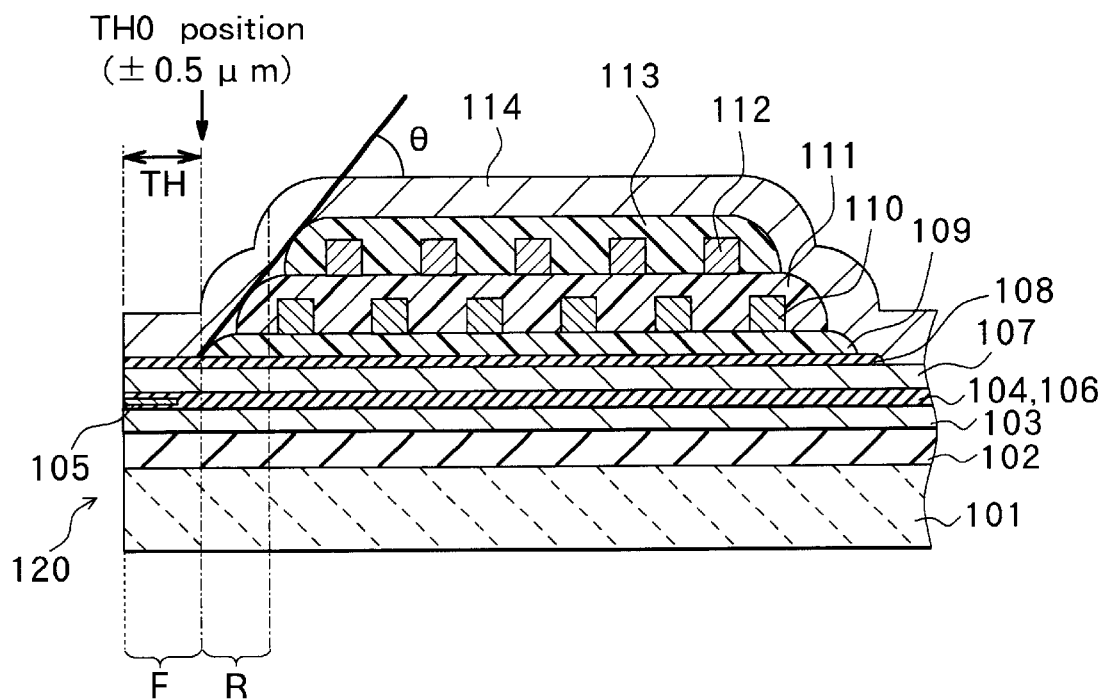
FIG. 35 is a cross sectional view of the structure of the thin film magnetic head of the related art.
Figure 36:
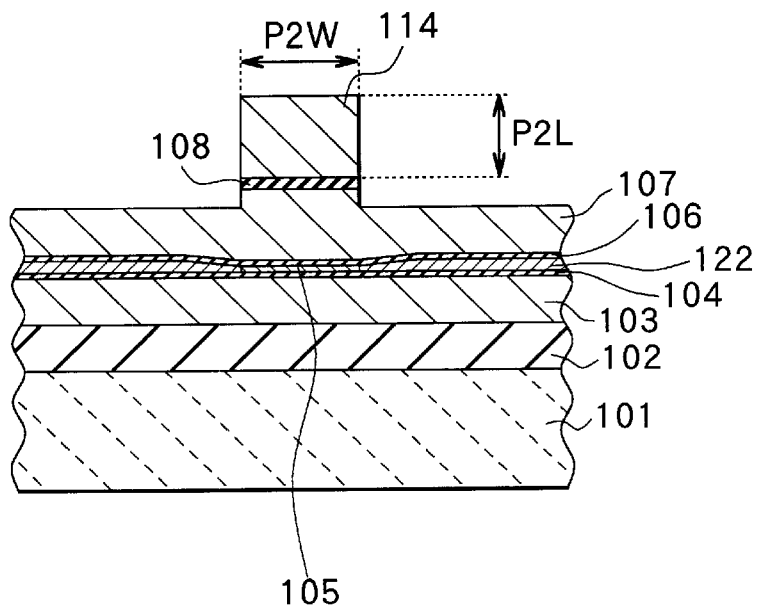
FIG. 36 is a cross sectional view of a cross section of the thin film magnetic head of the related art, parallel to an air bearing surface.
Figure 37:
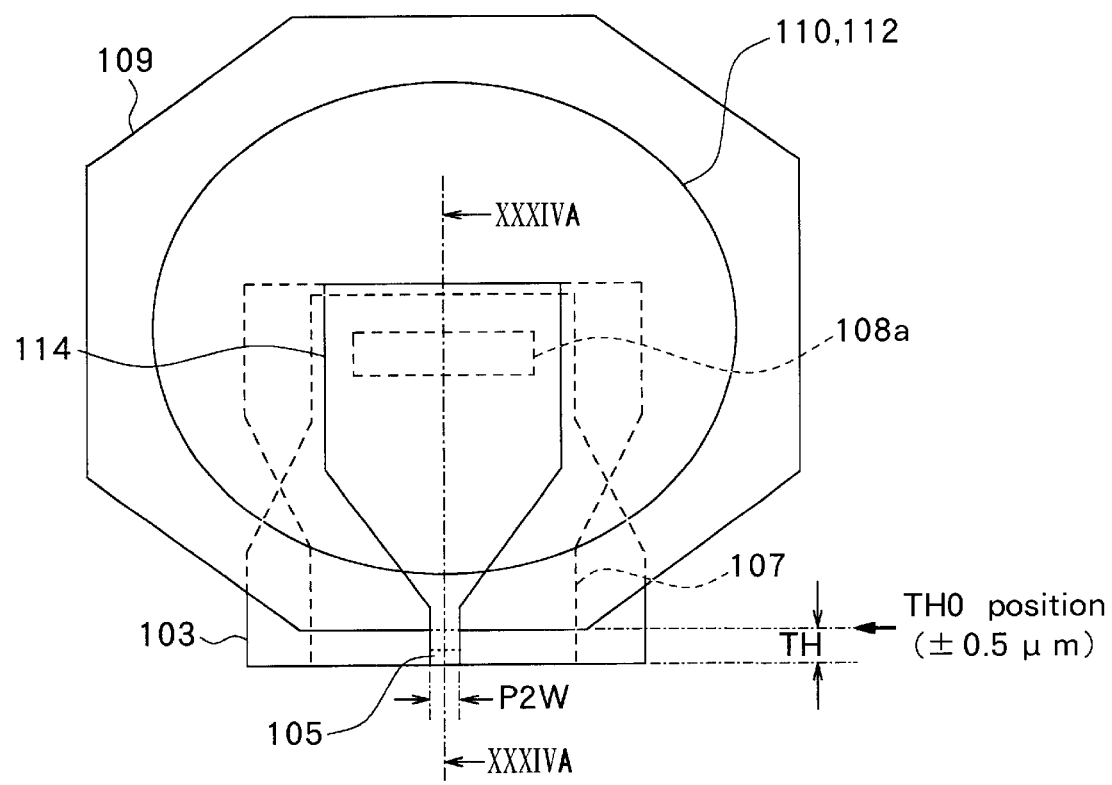
FIG. 37 is a plan view of the structure of the thin film magnetic head of the related art.
Figure 38:
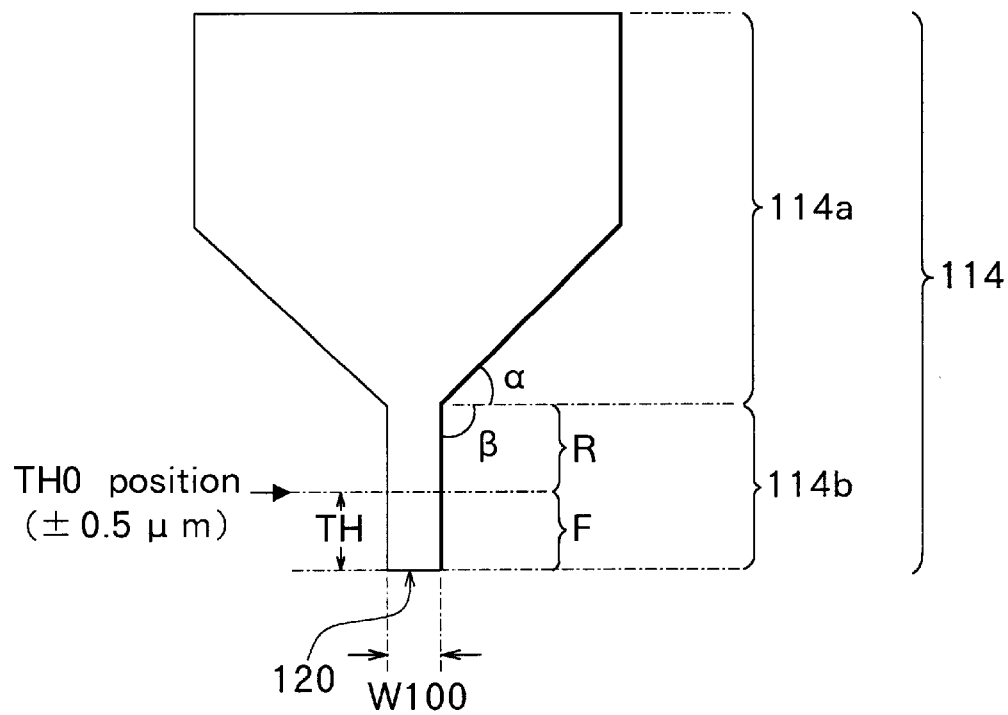
FIG. 38 is a plan view of the structure of a top pole of the thin film magnetic head of the related art.
Figure 39:
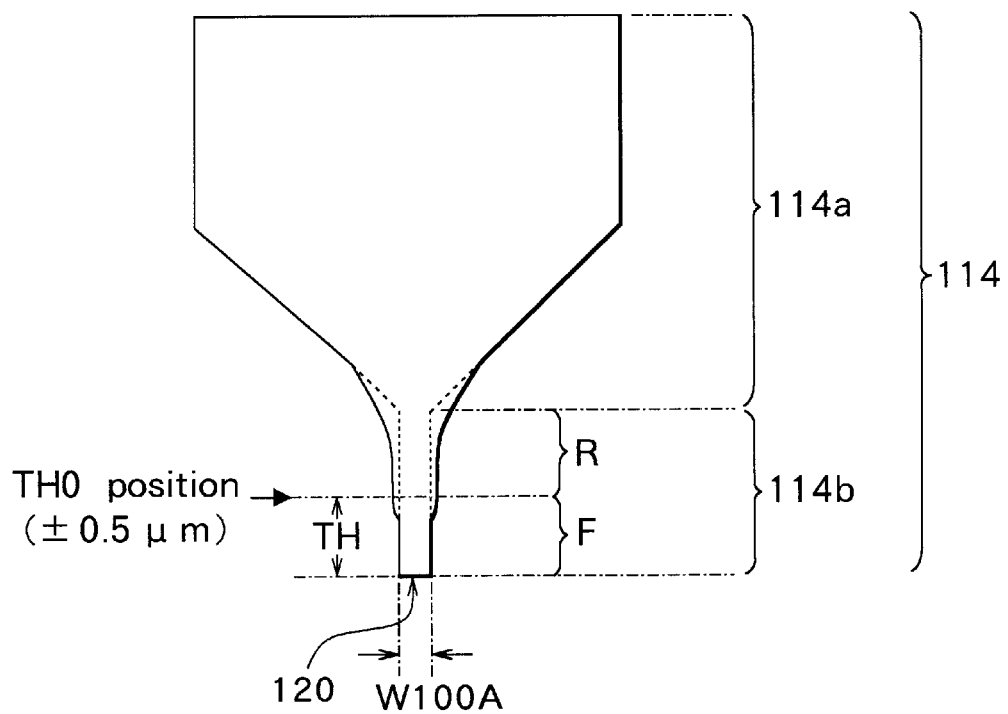
FIG. 39 is a plan view of the top pole for describing a problem of scale-down of the top pole of the thin film magnetic head of the related art.

FIGS. 29A and 30A show the cross section perpendicular to the air bearing surface. FIGS. 29B and 30B show the cross section of the magnetic pole portion parallel to the air bearing surface. FIG. 31 shows the plan structure of the completed thin film magnetic head. FIGS. 30A and 30B correspond to the cross sectional view taken along line XXXA—XXXA of FIG. 31.

Figures 28A, 28B:
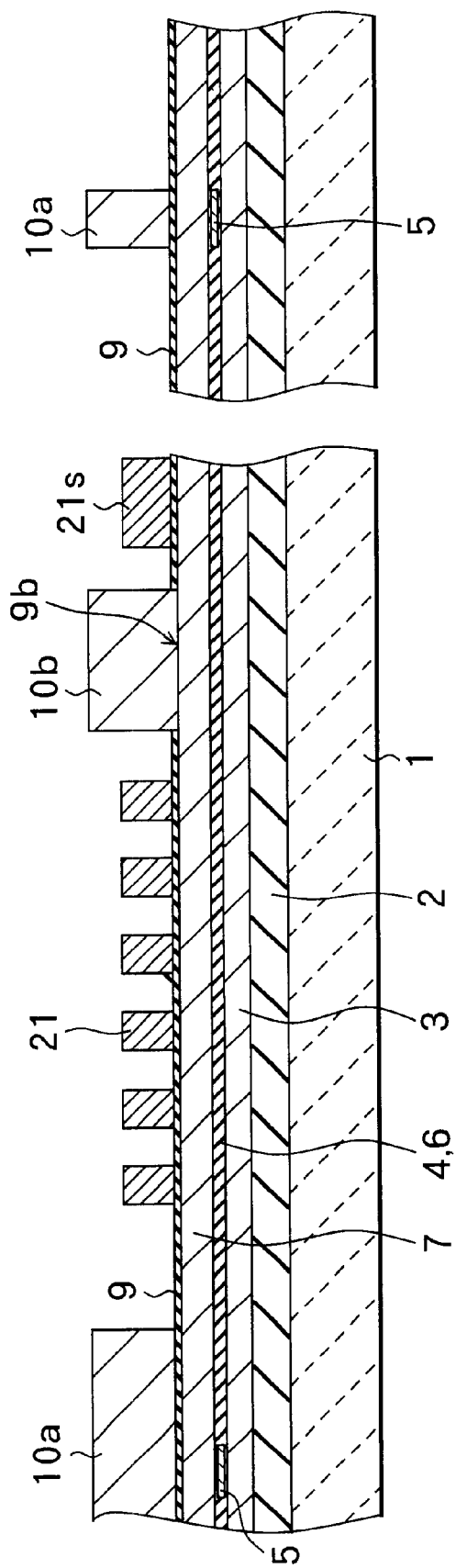
FIGS. 28A and 28B are cross sectional views for describing one process of the method of manufacturing the thin film magnetic head according to a fourth embodiment of the invention.

In the method of manufacturing the thin film magnetic head according to this embodiment, the process for forming the write gap layer 9 shown in FIGS. 28A and 28B is the same as that of FIGS. 1A and 1B in the above-described first embodiment. Thus, the description is omitted.

In this embodiment, as shown in FIGS. 28A and 28B, after the write gap layer 9 is formed over the whole surface, the opening 9b is formed by partly etching the write gap layer 9 in the region at the rear of the region in which the thin film coils 21 are formed in the following process. Then, a top pole chip 10a for constituting a part of the top pole is formed with a thickness of about 2 μm to 3 μm on the write gap layer 9 in the region at the front of the region in which the thin film coils 21 are formed in the following process. The top pole chip 10a has a rodlike (I-shaped) plan shape having only a uniform width as shown in FIG. 31, for example. Simultaneously with the formation of the top pole chip 10a, a magnetic path forming pattern 10b is formed also in the opening 9b. The materials of the top pole chip 10a and the magnetic path forming pattern 10b and the method of forming them are the same as those of the above-mentioned first embodiment. The top pole chip 10a corresponds to one specific example of "the first magnetic layer portion" of the invention.

Then, as shown in FIGS. 28A and 28B, the thin film coils 21 are formed on the write gap layer 9 in the region except the top pole chip 10a and the magnetic path forming pattern 10b in such a manner that the magnetic path forming pattern 10b is surrounded by the thin film coils 21. At the same time, the coil connection portion 21s constituting the inner peripheral end of the thin film coils 21 is formed at the rear of the magnetic path forming pattern 10b.

Then, as shown in FIGS. 30A and 30B, a top pole 320c is formed in the region from the top pole chip 10a through the insulating film 12 to the magnetic path forming pattern 10b. Thus, all of the top pole chip 10a, the top pole 320c, the magnetic path forming pattern 10b and the bottom pole 7 are magnetically coupled to one another, so that a continuous magnetic path is formed. The top pole 320c is formed in such a manner that the rear portion of the top pole chip 10a is covered with a part of a connection portion 320c(2) on three sides as shown in FIG. 31. The connection portion 320c(2) of the above-mentioned top pole 320c corresponds to one specific example of "the second magnetic layer portion" of the invention. A yoke portion 320c(1) corresponds to one specific example of "the additional magnetic layer portion" of the invention.

Then, as shown in FIGS. 30A and 30B, the write gap layer 9 and the bottom pole 7 around the mask are etched in self-alignment by using as the mask the photoresist (not shown) selectively formed in the region at the rear of the front edge of the insulating film 12 and the top pole and the top pole chip 10a located at the front of the front edge of the insulating film 12, whereby the trim structure is formed. Then, an overcoat layer 13 is formed over the whole surface. Finally, the slider is machined, whereby the air bearing surface 60 of the recording head and the reproducing head is formed. As a result, the thin film magnetic head is completed.

According to this embodiment, the top pole chip 10a has a simple rodlike (I-shaped) plan shape. Also, the top connection portion 20a of the above-mentioned first embodiment is eliminated so that the rear portion of the top pole chip 10a is directly covered with the connection portion 320c(2) of the top pole 320c on three sides. Thus, the structure can be simplified, and therefore the number of manufacturing processes can be reduced. Other functions and effects are the same as those of the above-described first embodiment.

Although the invention has been described above by referring to some embodiments, the invention is not limited to these embodiments and various modifications of the invention are possible. For example, the method of manufacturing the composite thin film magnetic head has been described in the above-mentioned embodiments and modifications thereof However, the invention is applicable to the record-only thin film magnetic head having an inductive magnetic transducer for writing or the thin film magnetic head having the inductive magnetic transducer for both of recording and reproducing. Moreover, the invention can be applied to the thin film magnetic head having the structure in which the element for writing and the element for reading are laminated in reverse order.

In this embodiment, NiFe or iron nitride (FeN), for example, is used as a top pole 10c and the top pole chip 10a. However, besides these materials, the material having the high saturation magnetic flux density, such as an amorphous material of Fe—Co—Zr, may be used, or a lamination of two or more of these materials may be used. Moreover, the magnetic material composed of the lamination of NiFe and the above-mentioned material having the high saturation magnetic flux density may be used as the bottom pole 7.

As described above, according to a thin film magnetic head or a method of manufacturing a thin film magnetic head of the invention, one of the two magnetic poles includes a first magnetic layer portion extending away from the recording-medium-facing surface along the gap layer and having a uniform width for defining a recording track width on the recording medium. The insulating layer includes a first insulating layer having a reference edge for defining the edge on a recording-medium-facing surface side of the insulating layer and formed in a region between the first magnetic layer portion and the thin film coils along the gap layer, and a second insulating layer for embedding the thin film coils. One of the two magnetic layers including the one of the two magnetic poles includes a second magnetic layer portion covering at least the first insulating layer and magnetically coupled to the first magnetic layer portion. Thus, the so-called throat height is defined by the reference edge of the first insulating layer. Because of the presence of the second magnetic layer portion with which the first insulating layer is coated, the sufficient magnetic volume is ensured in the region near the position at which the throat height is zero. Moreover, the magnetic flux propagating through the second magnetic layer portion flows along the slope near the reference edge of the first insulating layer. Thus, the magnetic flux smoothly flows near the position at which the throat height is zero. It is therefore possible to effectively prevent the saturation of the magnetic flux generated by the thin film coils immediately before flowing into the first magnetic layer portion. Thus, even when the width of the first magnetic layer portion is reduced to, for example, the submicron range, a necessary and sufficient magnetic flux can be supplied to tip of the first magnetic layer portion. The effect of being able to ensure the excellent overwrite properties is therefore achieved.

More particularly, according to the thin film magnetic head or the method of manufacturing the thin film magnetic head of another aspect of the invention, the one of the two magnetic poles further includes a third magnetic layer portion magnetically coupled to the first magnetic layer portion, extending in a direction opposite to the recording-medium-facing surface and having a width greater than the width of the first magnetic layer portion. The third magnetic layer portion is surrounded on at least three sides by the second magnetic layer portion. Thus, the area of contact between the second and third magnetic layer portions is increased. Accordingly, the loss of magnetic flux propagation on the boundary between these two magnetic layers can be reduced. A good flow of the magnetic flux from the second magnetic layer portion to the first magnetic layer portion is allowed.

Moreover, according to the thin film magnetic head or the method of manufacturing the thin film magnetic head of still another aspect of the invention, the first magnetic layer portion is partly surrounded on at least three sides by the second magnetic layer portion. Thus, the loss of magnetic flux propagation can be further reduced. The better flow of the magnetic flux from the second magnetic layer portion to the first magnetic layer portion is allowed.

Moreover, according to the thin film magnetic head or the method of manufacturing the thin film magnetic head of still another aspect of the invention, the first magnetic layer portion and the third magnetic layer portion extend in contact with the flat gap layer. Thus, for example, when the first and third magnetic layer portions are formed by the photolithography, the invention can prevent the increase in the photoresist pattern width resulting from the reflected light from the underlying layer during the exposure, differently from the related art. As a result, the width of the first magnetic layer portion becomes uniform over the whole length. The recording track width on the recording medium is more precisely controlled.

Moreover, according to the thin film magnetic head or the method of manufacturing the thin film magnetic head of still another aspect of the invention, the first and third magnetic layer portions whose underlying layers are located on the flat region are formed through dry process using a material containing iron nitride, and the second magnetic layer portion whose underlying layer is located on the rough region is formed through electroplating process using a material containing nickel and iron. It is allowed to form the magnetic pole having appropriate magnetic properties regardless of a condition of the underlying layer.

Moreover, according to the thin film magnetic head or the method of manufacturing the thin film magnetic head of still another aspect of the invention, the magnetic pole further includes at least two fourth magnetic layer portions magnetically coupled to the third magnetic layer portion, separated in a direction of the recording track width, and extending in the region opposite to the recording-medium-facing surface of the third magnetic layer portion. The fourth magnetic layer portions are surrounded on at least three sides by the second magnetic layer portion. Thus, the loss of magnetic flux propagation between different magnetic layers can be further reduced. The still better flow of the magnetic flux from the second magnetic layer portion to the first magnetic layer portion is allowed.

Moreover, according to the thin film magnetic head or the method of manufacturing the thin film magnetic head of still another aspect of the invention, the first insulating layer and the second insulating layer constitute a continuous structure which is integrally formed by the same process using the same material. It is allowed to simplify the manufacturing process.

Moreover, according to the thin film magnetic head or the method of manufacturing the thin film magnetic head of still another aspect of the invention, when the one of the two magnetic layers further includes a fifth magnetic layer portion partly covering the thin film coils with the second insulating layer in between, the second magnetic layer portion and the fifth magnetic layer portion constitute the continuous structure which is integrally formed by the same process using the same material. It is allowed to simplify the manufacturing process.

According to the method of manufacturing a thin film magnetic head of still another aspect of the invention, the method comprises the steps of forming one of the two magnetic poles on the gap layer so as to include a portion extending away from the recording-medium-facing surface and having a uniform width for defining a recording track width on the recording medium; forming a reference-defining insulating layer in the region opposite to the recording-medium-facing surface on the gap layer, the reference-defining insulating layer constituting a part of the insulating layer and having a reference edge for defining the edge on a recording-medium-facing surface side of the insulating layer, the surface of the reference-defining insulating layer near the reference edge forming a slope; forming a coupling magnetic layer so as to cover at least the reference-defining insulating layer, the coupling magnetic layer constituting a part of one of the two magnetic layers including the one of the two magnetic poles, and being magnetically coupled to the magnetic pole formed on the gap layer; forming the thin film coils along the gap layer; and embedding the thin film coils in a embedding insulating layer constituting another part of the insulating layer. Thus, the so-called throat height is defined by the reference edge of the reference-defining insulating layer. Because of the presence of the coupling magnetic layer with which the reference-defining insulating layer is coated, the sufficient magnetic volume is ensured in the region near the position at which the throat height is zero. Moreover, the magnetic flux propagating through the coupling magnetic layer flows along the slope near the reference edge of the reference-defining insulating layer. Thus, the magnetic flux smoothly flows near the position at which the throat height is zero. It is therefore possible to effectively prevent the saturation of the magnetic flux generated by the thin film coils immediately before flowing into the portion of a uniform width of the magnetic pole. Thus, even when the width of the portion of a uniform width of the magnetic pole is reduced to, for example, the submicron range, the necessary and sufficient magnetic flux can be supplied to the tip of the magnetic pole. It is allowed to ensure the excellent overwrite properties.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
   two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers,
   wherein one of the two magnetic poles includes a first magnetic layer portion extending away from the recordini-medium-facing surface alone the gap layer and having a uniform width for defining a recording track width on the recording medium,
   the insulating layer includes a first insulating layer having a reference edge for defining the edge on a recording-medium-facing surface side of the insulating layer and formed in a region between the first magnetic layer portion and the thin film coils in the region alone the gap layer, and a second insulating layer for embedding the thin film coils, and
   one of the two magnetic layers including the one of the two magnetic poles includes the first magnetic layer portion and a second magnetic layer portion covering at least the first insulating layer and magnetically coupled to the first magnetic layer portion, wherein the third magnetic layer portion is surrounded on at least three sides by the second magnetic layer portion.

2. A thin film magnetic head according to claim 3, wherein the one of the two magnetic poles further includes: a third magnetic layer portion magnetically coupled to the first magnetic layer portion, extending in a direction opposite to the recording medium facing surface and having a width greater than the width of the first magnetic layer portion.

3. A thin film magnetic head according to claim 2, wherein the one of the two magnetic poles including the first magnetic layer portion and the third magnetic layer portion has a T-shaped plan shape.

4. A thin film magnetic head according to claim 2, wherein the width of the third magnetic layer portion is gradually increased as it is farther from the recording-medium-facing surface.

5. A thin film magnetic head according to claim 2, wherein the first magnetic layer portion and the third magnetic layer portion extend in contact with the gap layer.

6. A thin film magnetic head according to claim 5, wherein the first magnetic layer portion and the third magnetic layer portion of the magnetic pole are formed through dry process, and the second magnetic layer portion is formed through electroplating process.

7. A thin film magnetic head according to claim 6, wherein the first magnetic layer portion and the third magnetic layer portion of the magnetic pole are made of a material containing iron nitride, and the second magnetic layer portion is made of a material containing nickel and iron.

8. A thin film magnetic head according to claim 1, wherein the first magnetic layer portion is surrounded on at least three sides by the second magnetic layer portion.

9. A thin film magnetic head according to claim 1, wherein the first insulating layer and the second insulating layer constitute a continuous structure which is integrally formed by the same process using the same material.

10. A thin film magnetic head comprising: two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers, wherein one of the two magnetic poles includes a first magnetic layer portion extending away from the recording-medium-facing surface along the gap layer and having a uniform width for defining a recording track width on the recording medium, the insulating layer includes a first insulating layer having a reference edge for defining the edge on a recording-medium-facing surface side of the insulating layer and formed in a region between the first magnetic layer portion and the thin film coils in the region along the gap layer, and a second insulating layer for embedding the thin film coils, one of the two magnetic layers including the one of the two magnetic poles includes the first magnetic layer portion and a second magnetic layer portion covering at least the first insulating layer and magnetically coupled to the first magnetic layer portion, a third magnetic layer portion magnetically coupled to the first magnetic layer portion, extending in a direction opposite to the recording-medium-facing surface and having a width greater than the width of the first magnetic layer portion, and at least two fourth magnetic layer portions magnetically coupled to the third magnetic layer portion, separated in a direction of the recording track width, and extending in the region opposite to the recording-medium-facing surface of the third magnetic layer portion.

11. A thin film magnetic head according to claim 10, wherein the fourth magnetic layer portions extend in contact with the gap layer.

12. A thin film magnetic head according to claim 10, wherein the fourth magnetic layer portions extend on the first insulating layer.

13. A thin film magnetic head according to claim 10, wherein each of the fourth magnetic layer portions is surrounded on at least three sides by the second magnetic layer portion.

14. A thin film magnetic head comprising: two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers, wherein one of the two magnetic poles includes a first magnetic layer portion extending away from the recording-medium-facing surface along the gap layer and having a uniform width for defining a recording track width on the recording medium, the insulating layer includes a first insulating layer having a reference edge for defining the edge on a recording-medium-facing surface side of the insulating layer and formed in a region between the first magnetic layer portion and the thin film coils in the region along the gap layer, and a second insulating layer for embedding the thin film coils, and one of the two magnetic layers including the one of the two magnetic poles includes the first magnetic layer portion and a second magnetic layer portion covering at least the first insulating layer and magnetically coupled to the first magnetic layer portion, wherein the one of the two magnetic layers further includes an additional magnetic layer portion partly covering the thin film coils with the second insulating layer in between, and the second magnetic layer portion and the additional magnetic layer portion constitute the continuous structure which is integrally formed by the same process using the same material.

* * * * *